US007512929B2

(12) United States Patent
Sangal et al.

(10) Patent No.: US 7,512,929 B2
(45) Date of Patent: Mar. 31, 2009

(54) APPARATUS AND METHOD FOR MANAGING DESIGN OF A SOFTWARE SYSTEM USING DEPENDENCY STRUCTURE

(75) Inventors: Neeraj Sangal, Andover, MA (US); Everette T. Jordan, Needham, MA (US); Francis A. Waldman, Stoneham, MA (US); Carl D. Parisi, Chelmsford, MA (US)

(73) Assignee: Lattix Inc., Andover, MA (US)

( * ) Notice: Subject to any disclaimer, the term of this patent is extended or adjusted under 35 U.S.C. 154(b) by 585 days.

(21) Appl. No.: 10/941,618

(22) Filed: Sep. 15, 2004

(65) Prior Publication Data

US 2005/0160411 A1    Jul. 21, 2005

Related U.S. Application Data

(60) Provisional application No. 60/504,401, filed on Sep. 19, 2003, provisional application No. 60/605,923, filed on Aug. 31, 2004.

(51) Int. Cl.
*G06F 9/44* (2006.01)

(52) U.S. Cl. ..................................................... 717/100

(58) Field of Classification Search .......... 717/120–127
See application file for complete search history.

(56) References Cited

U.S. PATENT DOCUMENTS

| 6,106,572 | A | 8/2000 | Halpern | 717/4 |
|---|---|---|---|---|
| 6,256,773 | B1 * | 7/2001 | Bowman-Amuah | 717/121 |
| 6,269,475 | B1 * | 7/2001 | Farrell et al. | 717/113 |
| 6,751,218 | B1 * | 6/2004 | Hagirahim et al. | 370/390 |
| 6,937,598 | B1 * | 8/2005 | Hagirahim et al. | 370/356 |
| 7,114,148 | B2 * | 9/2006 | Irving et al. | 717/121 |
| 7,133,874 | B2 * | 11/2006 | Hill et al. | 707/102 |
| 7,185,317 | B2 * | 2/2007 | Fish et al. | 717/121 |
| 7,188,335 | B1 * | 3/2007 | Darr et al. | 717/121 |
| 7,194,730 | B2 * | 3/2007 | Pramberger | 717/120 |
| 7,210,129 | B2 * | 4/2007 | May et al. | 717/136 |
| 7,240,325 | B2 * | 7/2007 | Keller | 717/104 |
| 2002/0170042 | A1 * | 11/2002 | Do et al. | 717/143 |
| 2004/0034662 | A1 * | 2/2004 | Austin et al. | 707/104.1 |

OTHER PUBLICATIONS

Sullivan, Kevin J., Griswold, William G., Hallen, Ben and Yuanfang Cai, "The Structure and Value of Modularity in Software Design," Proceedings of the Joint International Conference on Software Engineering and ACM SIGSOFT Symposium on the Foundations of Software Engineering, Sep. 2001, Vienna.*

(Continued)

*Primary Examiner*—Wei Y. Zhen
*Assistant Examiner*—Philip R. Wang
(74) *Attorney, Agent, or Firm*—Bromberg & Sunstein LLP

(57) ABSTRACT

A method and apparatus for managing, in a computer system, design of a software system. Various embodiments include receiving an input to the computer system specifying dependency relationships among subsystems of the software system and providing an output from the computer system responsive to the input. A rule is imposed on at least one of the dependency relationships and data for the rule is provided as part of the input.

64 Claims, 33 Drawing Sheets

OTHER PUBLICATIONS

Qi Dong, "Representing Information Flow and Knowledge Management in Product Design Using the Design Structure Matrix" MIT ME Dept. SM Thesis Feb. 1999.

Maurer et al, "Tendencies towards more and more flexibility", Cambridge DSM Workshop, Cambridge, UK, Sep. 22-23, 2003.

Qi Dong, "Study of door subsystem design using the DSM method", www.dsmweb.org/scrap$_{13}$ book/door_designqi.htm (Jul. 15, 2003).

Sabbaghian, "Product Development Process Capture and Display Using Web-Based Technologies, Prc. IEEE Int'l Conf. on Systems", Man and Cybermetics, San Diego, CA Oct. 11-14, 1998, p. 2664-2669.

Yassine, "An Introduction to Modeling and Analyzing Complex Product Development Processes Using the Design Structure Matrix (DSM) Method", Quaderni d. Management, No. 9, 2004, www.quaderix-di-management.it.

Chedgey, Structuring a Code-base with Headway reView, White Paper, headway software, May 2002 www.headwaysoftware.com.

* cited by examiner

```
public class Token {
    static final public int COMMENT = 0;
    static final public int PREFIX = 1;
    static final public int BRACKETS = 2;
    static final public int URI = 3;
    static final public int PREFIXEDURI = 4;
    static final public int BRACES = 5;
    static final public int SEMICOLON = 6;
    static final public int WORD = 7;
    static final public int LITERAL = 8;

public String m_token = "";
    public int m_line = -1;
    public int m_type = 0;
    public ArrayList m_children = new ArrayList ();

public Token(int type, String token, int line) {
        m_type = type;
        m_token = token;
        m_line = line;
    } public String toString () {
        StringBuffer sb = new StringBuffer () ;
        sb.append ("(Type: ");
        sb.append (m_type);
        sb.append (", Token: ");
        sb.append (m_token);
        sb.append (" \"");
        java.util.Iterator i = m_children.iterator();
        while (i.hasNext ()) {
            sb.append (" ");
            sb.append (i.next (). toString ());
        }
        sb.append (") ");
        return sb.toString ();
    }
}
```

| Source | Rule | Target |
|---|---|---|
| $root | Can-Use | $root |
| $root | Can-Use | java.** |
| $root | Can-Use | javax.** |
| #Persistence | CANNOT-Use | #Presentation |

FIG. 22

| | | | | Neeraj | Sameer | Tommy | Frank | Bevin | Ev | Caroline | Megan | Susmita | Rohit | Claire | Sandy | ErinW | Carl | ErinCP | Nantan | Seth |
|---|---|---|---|---|---|---|---|---|---|---|---|---|---|---|---|---|---|---|---|---|
| LoanSys.jar | Server | Utils | HTMLstringUtils | 1 | | | | | 3 | | | | | | 3 | | | | 1 | |
| | | | XMLstringUtils | 2 | | | | | 3 | | | | | | 3 | | | | 1 | |
| | | | orderedMap | 3 | | | | | | | | | | | 4 | | | | 1 | |
| | | | seqList | 4 | | | | | | | | | | | 4 | | | | 1 | |
| | | calc | localTaxes | 5 | 5 | | 1 | | | | | | | | | | | | | |
| | | | payoff | 6 | 5 | | 1 | | | | | | | | | | | | | |
| | | | amortize | 7 | 4 | | 1 | | 3 | | | | 1 | | | | | | | |
| | | | propTaxes | 8 | 5 | | | | | | | | | | | | | | | |
| | | base | Loan | 9 | | | | | 1 | | | | | | | | | 2 | | 4 |
| | | | appForLoan | 10 | | | | | 2 | | | | | | | | | 2 | | 4 |
| | | | individual | 11 | | | | | | | | | | 3 | | | | 2 | | 3 |
| | | | loanException | 12 | | | | | | | | | | | | | | | | 4 |
| | | applicant | profile | 13 | | | | 1 | 4 | | | | 3 | | | | | | | |
| | | | otherAccounts | 14 | | | | 1 | 4 | | | | | | | | | | | |
| | | | creditHistory | 15 | | | | 1 | 4 | | | | | | | | | | | |
| | | auto | newCar | 16 | | 2 | | | | | | 4 | | | | | | | | |
| | | | newToYou | 17 | | 2 | | | | | | 4 | | | | | | | | |
| | | | motorcycle | 18 | | 2 | | | | | | 4 | | | | | | | | |
| | | | carApplication | 19 | | 2 | 1 | | | | | 4 | 2 | 1 | | | | | | |
| | | home | adjustable | 20 | 5 | | | 2 | | | | | | | 1 | | | | | |
| | | | adj7year | 21 | 5 | | | 2 | | | | | | | 1 | | | | | |
| | | | fixed15year | 22 | 5 | | | 2 | | | | | | | 1 | | | | | |
| | | | fixed30year | 23 | 5 | | | 2 | | | | | | | 1 | | | | | |
| | | | homeApplication | 24 | 4 | | 1 | 2 | | | | | | 2 | 1 | | | | | |
| | | present | logon | 25 | 1 | | 1 | | | | | | | | | 5 | | | | |
| | | | header | 26 | 1 | | 2 | | | | | | | | | 4 | | | | |
| | | | pageBuilder | 27 | 1 | | | | | | | | | | | 5 | | | | |
| | | | formBuilder | 28 | 1 | | | | | | | | | | | 5 | | | | |

FIG. 25

APPARATUS AND METHOD FOR MANAGING DESIGN OF A SOFTWARE SYSTEM USING DEPENDENCY STRUCTURE

CROSS REFERENCE TO RELATED APPLICATIONS

The present application claims priority from provisional application Ser. No. 60/504,401, filed Sep. 19, 2003, and provisional application 60/605,923, filed Aug. 31, 2004, each bearing the same title as the present applications. These related applications are each hereby incorporated herein by reference in their entireties.

TECHNICAL FIELD AND BACKGROUND ART

The present invention relates to apparatus and methods for managing design of a software system, and more particularly to methods and apparatus that address dependency structure of the software system.

Relationships between different parts of a software system have been displayed diagrammatically in several ways in the prior art. As an example, FIG. 1 illustrates an example provided by HEADWAY REVIEW™ (from Headway Software, Waterford, Ireland). A directed arrow, such as directed arrow 102, shows that the subsystem at the source of the arrow, such as source subsystem 104, depends on the subsystem at the target of the arrow, such as target subsystem 106. Furthermore, HEADWAY REVIEW™ also allows a user to display what the dependency is. For a software system written in an object oriented language such as Java, some dependencies may be method calls or references to the fields of an object or inheritance relationships. The complexity of displaying interrelationships, for even the limited nine subsystem system of FIG. 1, is evident.

FIGS. 2A and 2B from Yassine 2004 (Ali Yassine, "An Introduction to Modeling and Analyzing Complex Product Development Processes Using the Design Structure Matrix (DSM) Method", Quaderni di Management (Italian Management Review), www.quaderni-di-management.it, No. 9, 2004) is a prior art description of a system containing two subsystems. Dependency relationships between the subsystems are one of three possible types. In FIG. 2A, the Graph Representation 200 chart of these three types of relationships shows the two systems in a Parallel 202 relationship where neither subsystem A nor subsystem B depend on the other, a Sequential 204 relationship where subsystem B depends on subsystem A, but subsystem A does not depend on subsystem B, and a Coupled 206 relationship where subsystems A and B each depend on the other.

The types of directed graphs shown in FIG. 2A, also known as digraphs, may also be rendered in the form of a matrix, known as a Design Structure Matrix, or DSM as shown in FIG. 2B. The DSM Representation 250 of the digraph Parallel 202 relationship corresponds to the DSM Parallel 252 relationship, the digraph Sequential 204 relationship to the DSM Sequential 254 relationship, and the digraph Coupled 206 relationship to the DSM Coupled 256 relationship.

A DSM is a square matrix where a subsystem of a given system is placed as a header of a row of the matrix, and as a header of a column of the matrix. The row and column order of the subsystems is the same so that each subsystem is shown with a row named on the left and is shown with a column named at the top. Typically, the DSM is a binary matrix, where matrix cells contain either a 1 or a 0, or equivalently, an 'X' or the absence of any character. An indicator located at a grid location having commonality with a row and a column indicates a dependency of the subsystem associated with the row on the subsystem associated with the column. The indicators such as 'X' or '1' of these dependencies are also known as dependency marks.

In the Sequential 254 DSM representation, the subsystem A does not depend on subsystem B. Consequently, the cell in the row with A in the header, and the column with B in the header is empty, having no dependency mark. The contents of the cells in a row associated with a subsystem indicate what other subsystems the subsystem in the row header depends upon. Similarly, the contents of cells in a column associated with a subsystem indicate for the subsystem in the column header what other subsystems depend upon the subsystem in the column header. For the row with the header B in the Sequential 254 DSM representation, the 'X' in the cell corresponding to the row B and the column A indicates that B depends on A. Cells where A intersects itself and B intersects itself are rendered in black. As dependency of a given subsystems upon itself is generally not of interest in the types of analysis enabled by DSM, these are frequently drawn as black, or with a period or a dot.

Figure 3A:
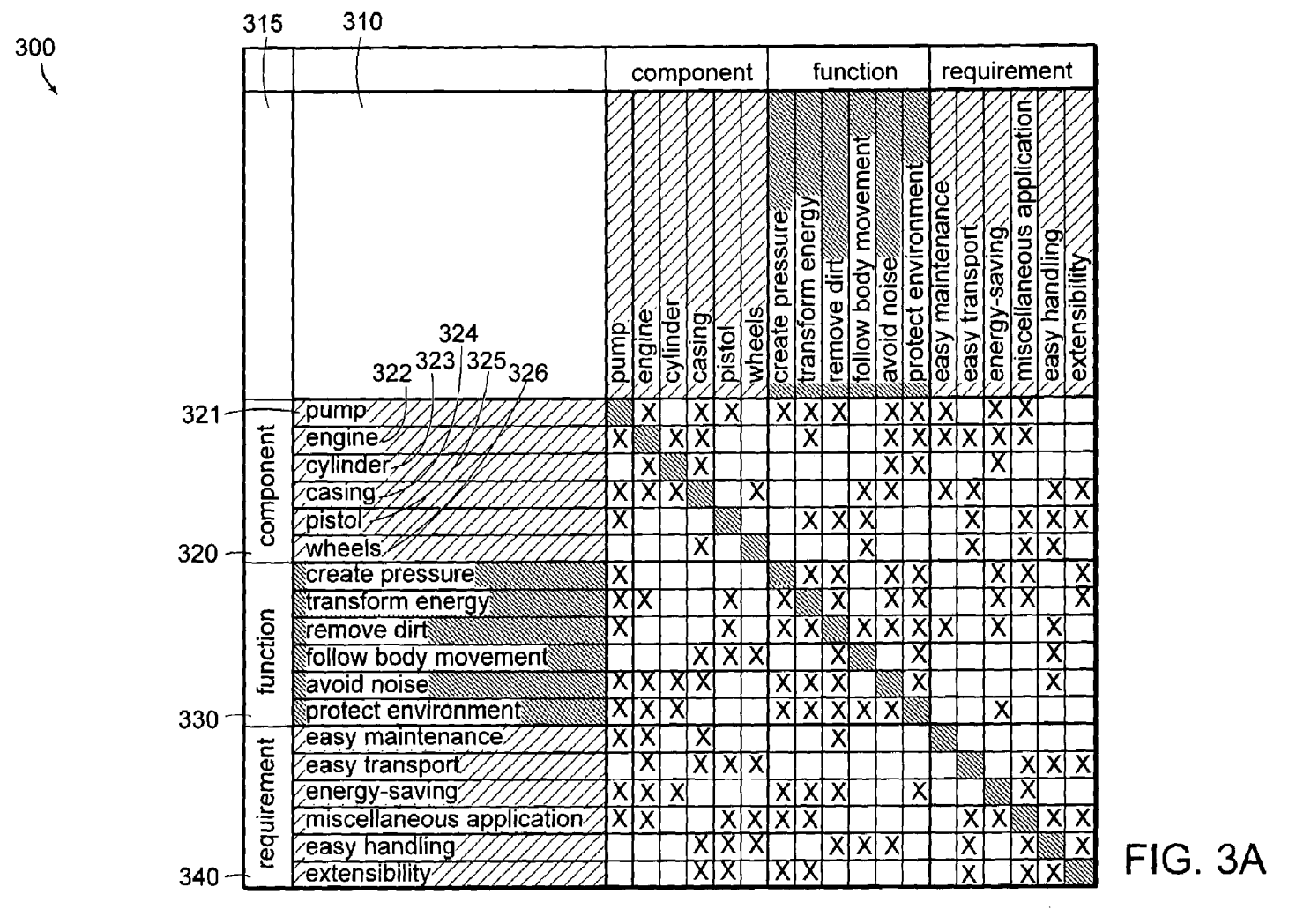

FIG. 3A, taken from Maurer et. al. (Maik Maurer, Udo Pulm, Udo Lindemann, "Tendencies toward more and more flexibility", 2003) includes a prior art engineering DSM 310 showing a dependency model of an automotive mechanical system with a limited use of hierarchy. Elements of the engineering DSM 300 correspond to a mixture of Subsystems (Components), Functions, and Requirements. The Maurer engineering DSM 310 shows the interrelated-ness between these different aspects of an automotive design.

The Maurer engineering DSM 310 represents hierarchy with names of parents 315 (component 320, function 330, and requirement 340) to the DSM elements rotated 90 degrees. DSM element parents 315 are not represented in the DSM 310 distinctly, only through children. For example component 320 is represented through children pump 321, engine 322, cylinder 323, casing 324, piston 325, and wheels 326. However, the parent elements 315 are essentially separate aspects of the design, and not hierarchal within any of the three aspects. Further, the Maurer engineering DSM is limited to two levels. FIG. 3B from Maurer et al. illustrates an engineering DSM 350 showing a dependency model of a mechanical system with limited use of hierarchy in the DSM. FIG. 3 contains a two level component hierarchy where both parents, for example, pump 360, and children, for example, centrifugal pump 362 and plunger pump 364, in the hierarchy each have their own row and column for displaying dependencies. Representation shows hierarchy Parents grayed but in same list with children.

Engineering DSM 370 shows a hierarchy where parent grid cells have a gray background color, but indicate dependencies by inclusion of Xs that are redundant with the X-indicated dependencies for the children. Engineering DSM 370 is similarly a two-level display. FIG. 4 is a prior art diagram from Sabbaghian et al. 1998 (Sabbaghian, Nader, Eppinger, Steven D., and Murman, Earll, "Product Development Process Capture & Display Using Web-Based Technologies", Proceedings of the IEEE International Conference on Systems, Man, and Cybernetics, San Diego, Calif., Oct. 11-14, 1998, pp. 2664-2669) showing conceptually how DSM's may be thought of as a hierarchy through a series of completely separate DSM's representing different levels of hierarchy. However, any hierarchy in FIG. 4 is shown in separate DSM's. There is no rendering mechanism implied other than separate DSM's.

FIG. 5 is an illustration of a prior art DSM 500 from Dong 1999 (Qi Dong—"Representing Information Flow and Knowledge Management in Product Design Using the Design Structure Matrix," MIT ME Dept SM Thesis, January, 1999) showing how a second level of hierarchy may be provided by coloring the row and column headers with different colors. In this illustration, DSM 500 contains four top level subsystems (spatial function 510, sheet metal 520, electrical 530, and moveable glass 540) each having children, for example sheet metal function subsystem 520 with children including outer panel shape subsystem 522, pillars 524, halo 526, etc. The four top level subsystems are differentiated by color. However, this is also a two-level display.

SUMMARY OF THE INVENTION

In a first aspect of the invention, there is provided a method for managing, in a computer system, design of a software system comprising receiving an input to the computer system specifying dependency relationships among subsystems of the software system and providing an output from the computer system responsive to the input. A rule is imposed on at least one of the dependency relationships and data for the rule is provided as part of the input.

The rule may allow, disallow, or require the dependency relationship or require dependency on a subsystem not specified in the dependency relationship. In certain embodiments, a plurality of rules may be imposed on at least one of the dependency relationships and data for the rules may be provided as part of the input. Input to the computer system specifying dependency relationships may be determined from metadata definitions.

In other embodiments, specifying dependency relationships may include processing program code associated with the software system to determine existing dependency relationships in such code and specifying such existing dependency relationships explicitly. The processing of the program code may occur automatically on providing of the program code as an input to the computer system.

In further embodiments, a graphical output may be provided in which appears a hierarchical display of the subsystems where the hierarchy is selectively expandable and collapsible. The display graphically may indicate dependencies among subsystems. The display may be represented as a dependency structure matrix. In an instance when a given parent subsystem has been expanded to show its hierarchical children, dependencies may be shown for such hierarchical children but not for such parent subsystem. The display may use color in a manner consistent with hierarchical relationships of subsystems to assist in identifying related subsystem and may be represented as a dependency structure matrix.

The hierarchical display of the subsystems may be altered and the dependencies among the subsystems automatically altered to be consistent with the altered hierarchical display.

The hierarchical display of a subsystem may be moved while preserving the dependencies of the subsystem, removed while removing dependencies of the subsystem, copied and inserted at another location in the hierarchical display while preserving the dependencies of the subsystem.

In certain embodiments, receiving an input to the computer system specifying dependency relationships among subsystems may include receiving an inheritable rule for a given subsystem so that the inheritable rule is inherited by any descendants of the given subsystem in the hierarchy.

In additional embodiments, receiving an input to the computer system specifying dependency relationships among subsystems may include receiving an override rule that has the effect of overriding any inheritable rule applied to an ancestor subsystem in the hierarchy. Such an override rule may itself be an inheritable rule. The override rule may have the effect of overriding any inheritable rule applied to an ancestor subsystem in the hierarchy, such override rule being itself an inheritable rule. Further, the display may be represented as a dependency structure matrix.

In still further embodiments, a reference to the rule imposed on the at least one dependency relationship may be provided as an output. Also, an output may be provided that includes a graphical output in which appears a hierarchical display of the subsystems graphically indicating dependencies among subsystems, and a graphical indication of a state of the rule imposed on the at least one dependency relationship. The display and the graphical indication may viewable simultaneously. The display may be represented as a dependency structure matrix where the indication of the state of the rule may be in a pertinent cell of the matrix. The indication of the state of the rule may include use of color, use of a symbol, or use of location of placement in the cell.

The display may be represented as a dependency structure matrix, and the indication of the state of the rule may be provided in a panel separate from the dependency structure matrix and viewable simultaneously with the matrix. The state of a rule, involving a given subsystem in the display for which children thereof are also displayed, may be indicated for such children and not for the given subsystem.

The display may be represented as a dependency structure matrix, and subsystems used by a subsystem selected in the hierarchical display may provided in a first panel separate from the dependency structure matrix and viewable simultaneously with the matrix. The subsystems used by the selected subsystem may be provided in the first panel in the form of a tree-structure. Subsystems that use a subsystem selected from the subsystems provided in the first panel may be provided in a second panel separate from the dependency structure matrix and the first panel and viewable simultaneously with the matrix and the first panel. Subsystems may be provided in the second panel in the form of a tree-structure.

In still further embodiments, a graphical output may be provided in which appears a hierarchical display of the subsystems graphically indicating dependencies among subsystems, and an input may include an inheritable rule for a given subsystem so that the inheritable rule is inherited by any descendants of the given subsystem in the hierarchy. The display may be represented as a dependency structure matrix.

In still other embodiments, the rule imposed on the at least one dependency relationship may be based on classification of relevant subsystems. The classification may be assignable manually, may be assigned automatically on the basis of prespecified criteria, or may be based on properties of the relevant subsystems. The properties may be assigned or may be determined automatically on the basis of prespecified criteria. The classification may be defined as part of a hierarchical classification system.

In still additional embodiments, the rule imposed on the at least one dependency relationship may be based on properties of the relevant subsystems. The properties may be assignable manually, may be determined automatically on the basis of prespecified criteria, or may include allowed sources of changes to the relevant subsystems, so that editing of the subsystems is subject to control in relation to sources.

In a second aspect of the invention, there is provided a method for managing, in a computer system, testing of a software system, including receiving an input to the computer system specifying dependency relationships among subsystems of the software system and providing a graphical output from the computer system responsive to the input. The graphical output includes an indicator of any subsystem changed by editing or addition of code.

In certain embodiments, the graphical output may include a hierarchical display of the subsystems indicating dependencies among subsystems in a dependency structure matrix. The graphical output may also include an indicator of any subsystem affected by editing or addition of code or a hierarchical display of the subsystems graphically indicating dependencies among subsystems in a dependency structure matrix. The graphical output may also include a subsystem label style for the graphical output of a changed subsystem different from a subsystem label style for the graphical output of a subsystem affected by the change. The indicator of a dependency relationship affected by a change to a subsystem may differ from an indicator of dependency unaffected by the change.

In a third aspect of the invention, there is provided a method for managing, in a computer system, design of a software system that includes receiving an input to the computer system specifying dependency relationships among subsystems of the software system; and providing a graphical output from the computer system responsive to the input, where the graphical output includes indicators of sources of the subsystems. The subsystems may be grouped according to a taxonomy, where the graphical output includes a matrix display including a series of taxonomical entities along one axis and sources along another axis. Sources may be associated with taxonomical entities for which they have had responsibility.

In certain embodiments, the graphical output may include a matrix display where the matrix includes a hierarchical display of the subsystems and the hierarchy is selectively expandable and collapsible, to facilitate indication of the sources of the subsystems. The matrix may also include a hierarchical organizational display of human resources associated with the sources where the hierarchical organizational display may be selectively expandable and collapsible.

In a third aspect of the invention, a method is provided for managing, in a computer system, design of a software system including receiving an input to the computer system specifying dependency relationships among subsystems of the software system and providing a graphical output in which appears a hierarchical display of the subsystems. The hierarchy is selectively expandable and collapsible and the display graphically indicates dependencies among subsystems.

In some embodiments, the display may be represented as a dependency structure matrix or, in an instance when a given parent subsystem has been expanded to show its hierarchical children, dependencies may be shown for such hierarchical children but not for such parent subsystem. Relation of such hierarchical children to such parent subsystem may be shown by placing the parent subsystem sidewise alongside such children.

In a fourth aspect of the invention, a method is provided for managing, in a computer system, design of a software system including receiving an input to the computer system specifying dependency relationships among subsystems of the software system and providing an output containing a hierarchy of the subsystems and the dependency relationships among the subsystems. The hierarchy is selectively expandable and collapsible.

In certain embodiments, the hierarchy of the subsystems may be altered and the dependency relationships among the subsystems automatically altered to be consistent with the altered hierarchy. The hierarchy of a subsystem may be moved or may be copied and inserted at another location in the hierarchy of the subsystems while preserving the dependencies of the subsystem. The hierarchy may be removed while removing dependencies of the subsystem.

In further embodiments, graphical output may be provided in which appears a hierarchical display of the subsystems, such display graphically indicating the dependencies among subsystems. The display may be represented as a dependency structure matrix. In an instance when a given parent subsystem has been expanded to show its hierarchical children, dependencies may be shown for such hierarchical children but not for such parent subsystem. Relation of such hierarchical children to such parent subsystem may be shown by placing the parent subsystem sidewise alongside such children.

In other embodiments, apparatus are provided which correspond to each of the foregoing methods and which implement them. In similar additional embodiments, there are provided program products, each of which includes computer readable code that establishes an apparatus corresponding with one of the foregoing methods.

BRIEF DESCRIPTION OF THE DRAWINGS

The foregoing features of the invention will be more readily understood by reference to the following detailed description, taken with reference to the accompanying drawings, in which:

FIGS. 3A and 3B show prior art DSM renderings with two fixed levels of hierarchy, in one case, with rotated first level headers from Maurer et al. (2003);

FIG. 16 illustrates a software system DSM in accordance with the embodiment of FIG. 10 shown in one window and the selected Class shown in an editor window;

FIG. 22 illustrates design rules using subsystem classifications in accordance with an embodiment of the present invention;

FIG. 25 illustrates a display of the level of knowledge of developers regarding implementation of individual software subsystems in accordance with an embodiment of the present invention

DETAILED DESCRIPTION OF SPECIFIC EMBODIMENTS

Figure 1:
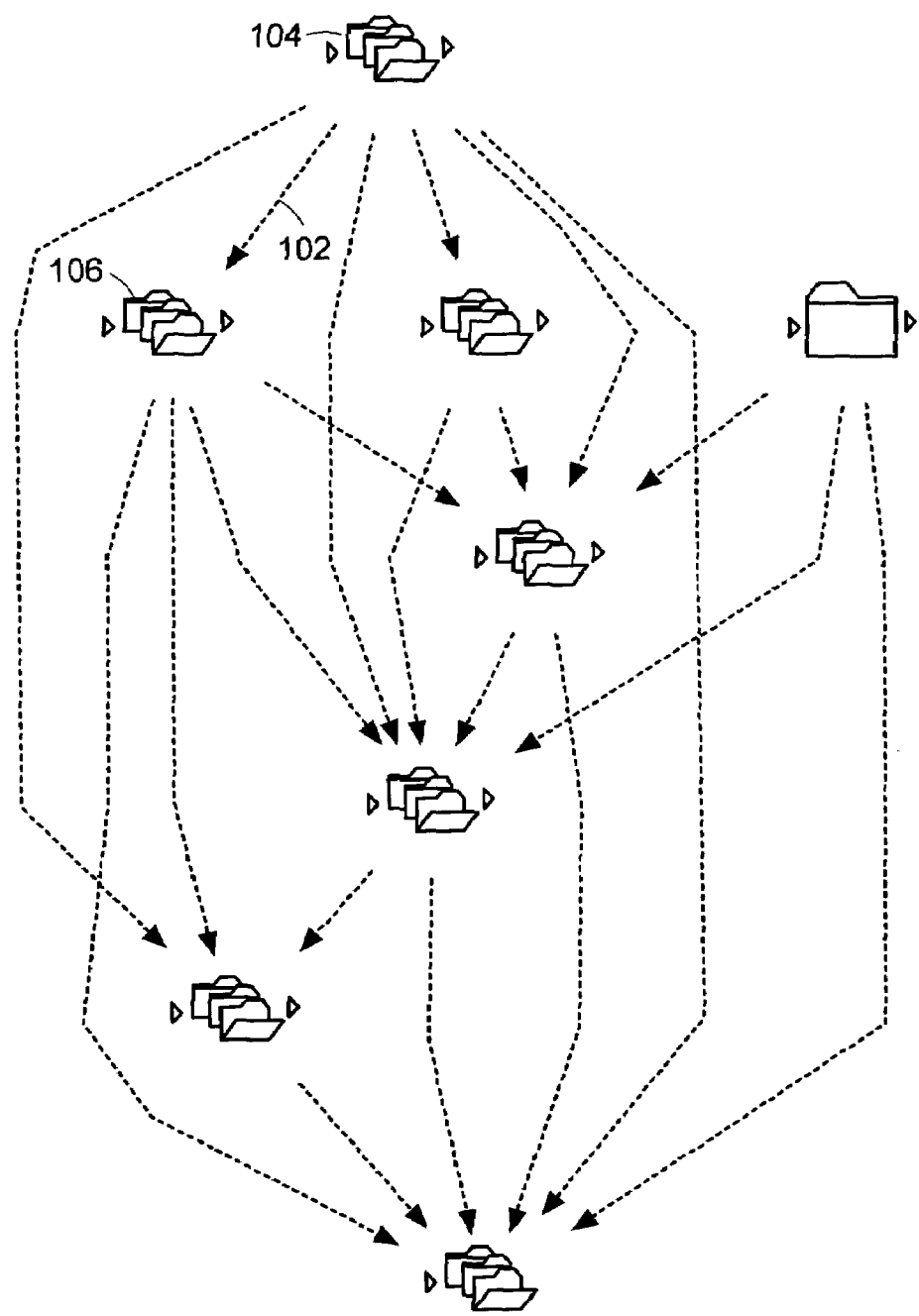
FIG. 1 is a prior art Directed Graph rendering of subsystem relationships from Headway Review.

Definitions. As used in this description and the accompanying claims, the following terms shall have the meanings indicated, unless the context otherwise requires:

A "dependency structure matrix" is a symmetric matrix, frequently a binary matrix, with matching horizontal and vertical axes, so that a corresponding row and column relate to the same subsystem and each cell has a value indicative of the presence or absence of a dependency. A DSM has also been referred to in the literature as a "dependency structure matrix", "dependency structure model", and "adjacency matrix."

A "subsystem" means any portion of a software system, regardless of the level of granularity, so that a subsystem includes class, package, module, component, layer, file, directory, partition, etc, depending on the level of granularity selected.

A "rule" means a design rule that relates to design of a software system.

The "state" of a rule means any one or more of: the existence of the rule, or the fact of violation of the rule, or the fact of compliance with the rule, or the nature of the rule.

The "classification" of a subsystem is the systematic grouping of subsystems into categories on the basis of characteristics or structural relationships between them. A "classification" of a software system is one of these categories assigned based on the criteria for systematic grouping.

A "property", generally, is a characteristic trait or peculiarity, especially one serving to define or describe its possessor. A "property" of a subsystem is a characteristic trait of that subsystem that is discernable externally and may be used for comparison, calculation, or in establishing criteria.

A "source" of a change or an edit to a subsystem means a person or group of persons who implemented the change or the edit.

A "taxonomy" of subsystems is an organizational scheme by which similar kinds of subsystems may be grouped together for purpose of identifying sources, wherein, for example, "user interface" and "presentations", might constitute distinct taxonomical entities.

A target subsystem is "affected" by a change made by editing or addition of code to a given subsystem if either (i) the target subsystem is the given subsystem or (ii) the target subsystem has a dependency relation with the given subsystem.

"Metadata" is "information about data" that describes the content, quality, condition, or other characteristics of data. Metadata is sometimes used to provide information about relationships between data, datasets, or entities. This includes information about relationships between user actions within a computer application or between objects in a computer application or between subsystems in a computer application.

Embodiments of the invention permit developers to more readily understand how different parts of a complex software system relate to one another. A designer may precisely define dependencies of one part of the software system on another part of the system in terms of a textual description, design rules, and set of actual dependencies. The design rules define the permissible ways in which subsystems may interact with each other, while the actual usage contains the actual dependencies. Designers may use the design rules to capture many of the design decisions, thereby permitting automatic verification and enforcement of the design rules. Consequently, the integrity of the product may be communicated and maintained over the life of the product.

Figure 6:
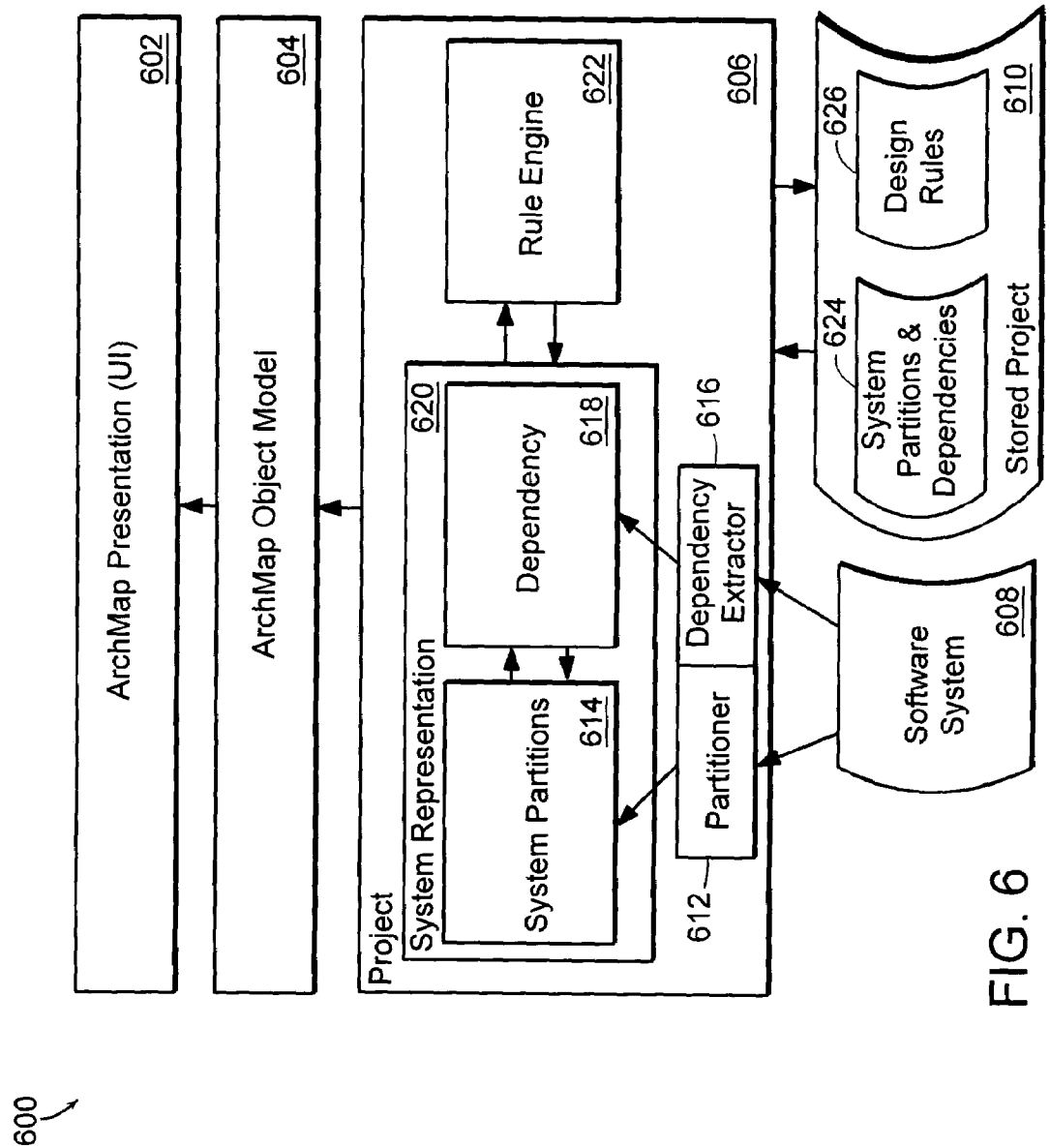
FIG. 6 provides an architectural block diagram of ArchMap, which has been implemented in accordance with an embodiment of the present invention.

FIG. 6 is a block diagram of an embodiment of the present invention, termed "ArchMap", computer application 600. In ArchMap, the Presentation (UI) subsystem 602 provides features for user interaction via a graphical windowing system, including, in certain cases, windows, menus, dialogs, and similar features.

In ArchMap, Object Model subsystem 604 provides the basic data structures and programming model for use by subsystems that perform user-level actions available as part of the ArchMap computer application 600. The ArchMap Object Model subsystem 604 provides (1) a layered interface to the lower subsystems of the overall system, (2) system functionality to group lower layer capabilities into user level actions, and (3) caching of certain data for improved system performance.

Project subsystem 606 provides business logic, data structures, and methods for the internal core of the ArchMap computer application 600, including internal System Representation 620 of Software System 608 being analyzed and provided with architecture management. The Project subsystem 606 also includes Rule Engine 622 for creating, modifying, and evaluating design rules.

Stored Project 610 is the stored portion of the Project 606, which is retained in non-volatile storage, such as hard disk, where System Partitions & Dependencies 624 and Design Rules 626 of the Software System 608 are stored for ongoing use.

Partitioner subsystem 612 and Dependency Extractor subsystem 616 initially parse the Software System 608. The Partitioner subsystem 612 produces an in-memory representation of System Partitions 614, which are part of the overall in-memory System Representation 620. As used herein, software partitions are equivalent to software subsystems. In FIG. 6, the Software Partitions 614 indicates information related to subsystems of the Software System 608 being analyzed and managed. Dependency Extractor 616 produces an in-memory representation of Dependency information 618 for dependencies between different System Partitions 614.

Following initial parsing of the Software System 608, the user of ArchMap computer application 600 may begin to define Design Rules 626 for the Software System 608. Design Rules 626 are rules regarding permissible or asserted Dependency 618 relationships between System Partitions 614. Rule Engine 622 evaluates Design Rules 626 and determines if any violations of the Design Rules 626 exist between the System Partitions 614 and the Dependency 618 relationships. The Rule Engine 622 also provides methods for creating, modifying, and deleting the Design Rules 626.

Figure 7:
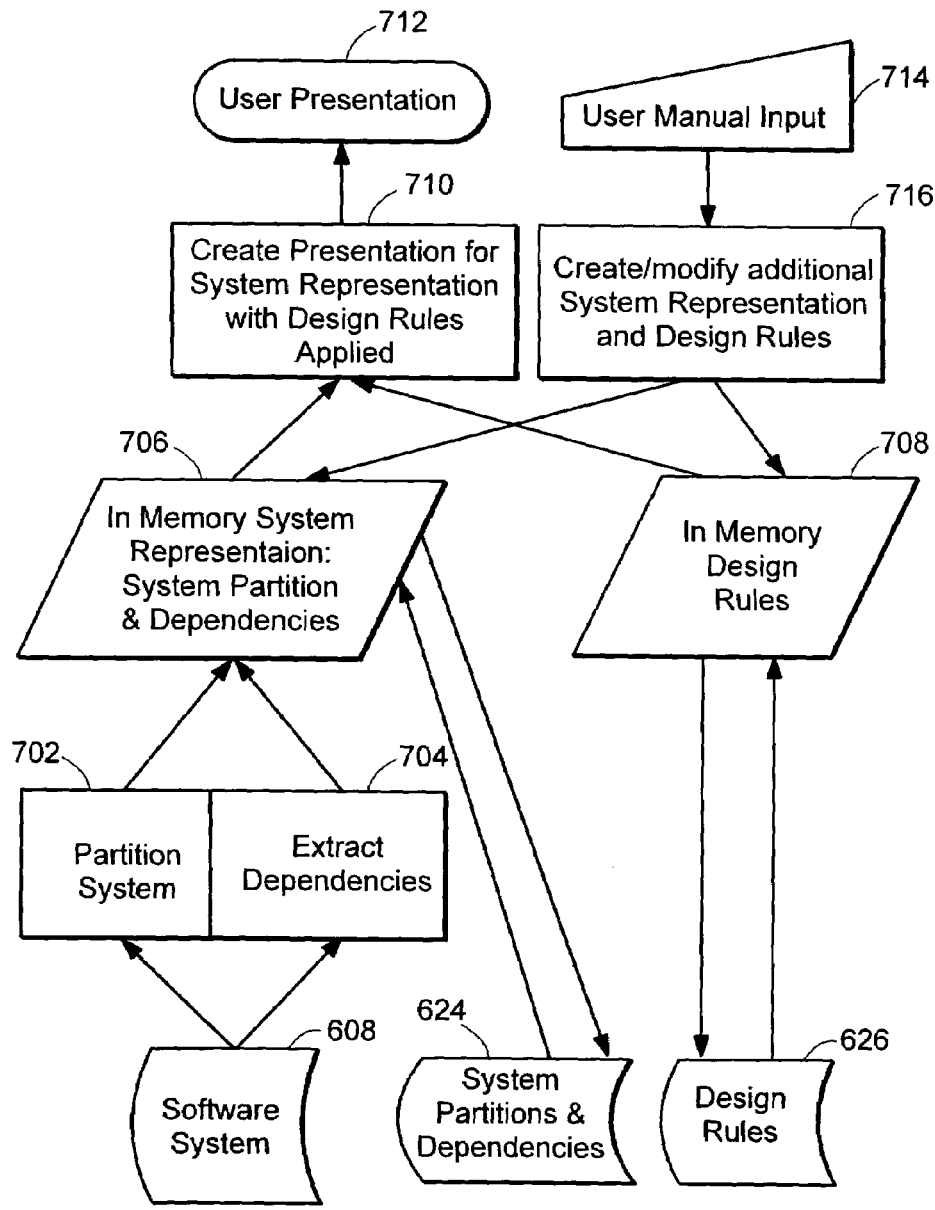
FIG. 7 is a flow chart architectural diagram of ArchMap.

FIG. 7 provides a flow chart of information processing of the embodiment of the ArchMap computer application 600. The Software System 608 to be analyzed and managed is parsed using Partition System 702 and Extract Dependencies 704. Partition System 702 partitions the Software System 608 and produces an in-memory representation of the system partitions, System Partitions 614, which are part of the overall in memory System Representation 706. As mentioned previously, software partitions are equivalent to software subsystems and Software Partitions 614 contain information related to the subsystems of the Software System 608 being analyzed and managed.

The Extract Dependencies 704 process produces an in-memory representation of the dependency information, Dependency 618, for dependencies between different system partitions, System Partitions 614. Together, the Partition System 702 and the Extract Dependencies 704, produce the In Memory System Representation: System Partition & Dependencies 706. From the In Memory System Representation: System Partition & Dependencies 706, Create Presentation for System Representation with Design Rules Applied" 710 may create User Presentation 712, which is the on-screen presentation of this information to the user. With creation of User Presentation 712, the user of the ArchMap computer application 600 may define Design Rules 626 applicable to the In Memory System Representation 706.

The user of ArchMap computer application 600 may use Create/Modify Additional System Representation and Design Rules 716 to augment In-Memory System Representation: System Partition & Dependencies 706 by partition editing operations such as creating new partitions, splitting partitions, aggregating partitions, deleting partitions, and renaming partitions. When Design Rules 626 are created or modified by the process Create/Modify Additional System Representation and Design Rules 716, Design Rules 626 are initially stored in In-Memory Design Rules 708 data. In-Memory System Representation: System Partition & Dependencies 706 and In-Memory Design Rules 708 data may be written out to the stored versions of System Partitions & Dependencies 624 and Design Rules 626.

Once stored as System Partitions & Dependencies 624 and Design Rules 626, In-Memory System Representation: System Partition & Dependencies 706 and In-Memory Design Rules 708 data may be read from the stored versions of System Partitions & Dependencies 624 and Design Rules 626, rather than as a result of re-executing processes Partition System 702 and Extract Dependencies 704. Alternatively, an updated In-Memory System Representation: System Partition & Dependencies 706 may be generated by Partition System 702 and Extract Dependencies 704 processing a new version of the Software System 608. Create Presentation for System Representation with Design Rules Applied 710 may include information on the evaluation of the In-Memory Design Rules 708 against In-Memory System Representation: System Partition & Dependencies 706 in the User Presentation 712. The updated In-Memory System Representation: System Partition & Dependencies 706 may be written back out to update the stored System Partition & Dependencies 624.

Figure 8:
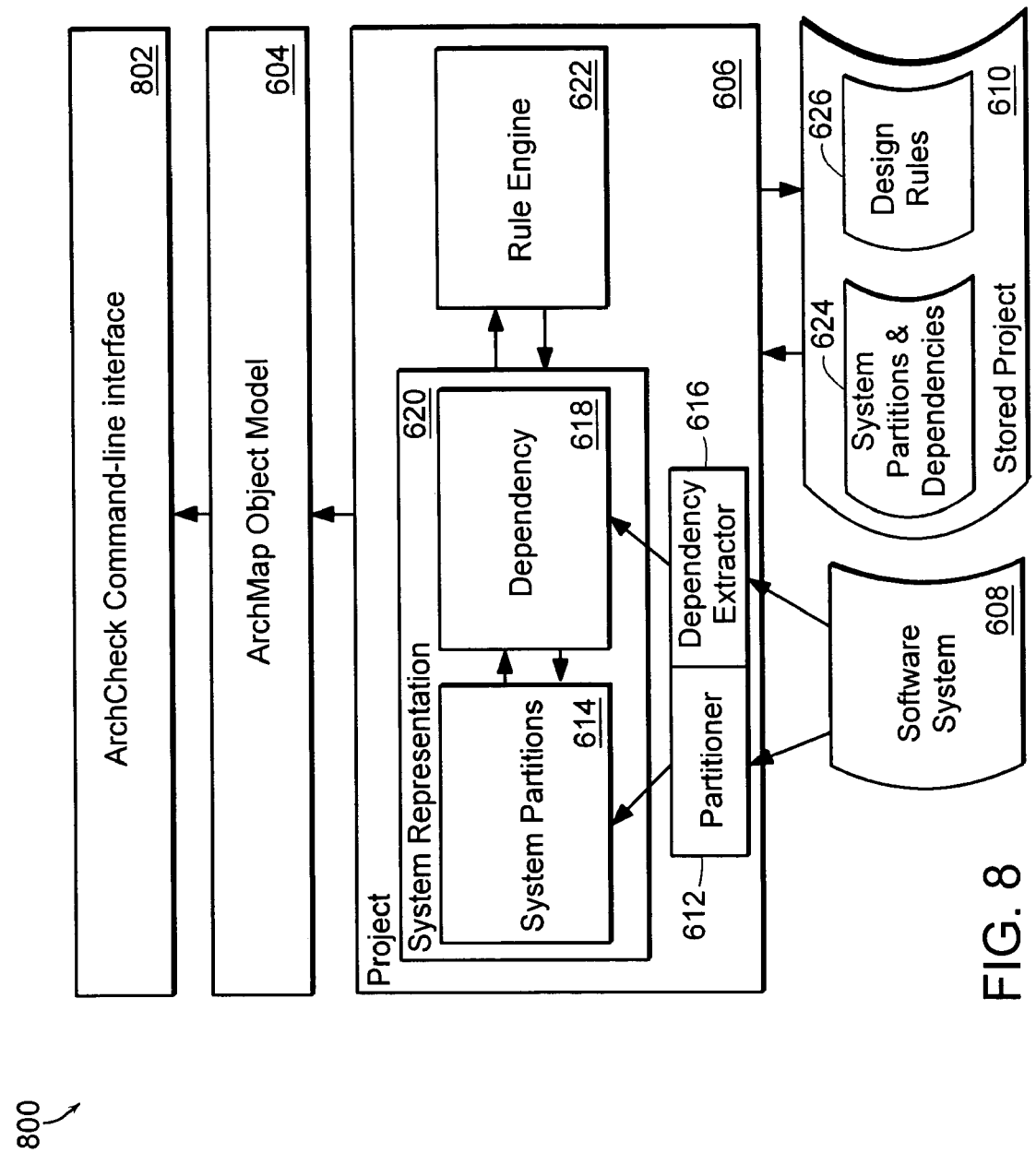
FIG. 8 is an architectural block diagram of ArchCheck.

FIG. 8 illustrates ArchCheck 800, an additional embodiment of the present invention, as a block diagram. ArchCheck 800 is a command-line computer application suitable for inclusion in Software System 608 build processes or other related software development activities such as source code revision-control submission procedures. ArchCheck Command-line Interface subsystem 808 provides command-line access to functionality to evaluate a new version of the Software System 608 against a previously saved Stored Project 610, in particular, against the previously saved Design Rules 626. Furthermore, the ArchCheck computer application 800 may update the Stored Project 610 with new information regarding the System Partitions & Dependencies 624. The ArchCheck Command-line Interface subsystem 802 utilizes the same subsystems as the ArchMap Presentation (UI) subsystem 602.

The ArchCheck computer application 800 may operate when there exists a Stored Project 610 created from a prior version of the Software System 608 under analysis and management. ArchCheck computer application 800 may allow comparison of a new version of the Software System 608 with the prior version of Software System 608 and evaluation against the established Design Rules 626. The new version of the Software System 608 is again parsed by the Partitioner 612 and Dependency Extractor 616 subsystems and produces an In-Memory System Representation 620 of the new version of the Software System 608.

The Project subsystem 606 compares the new System Representation 620 with the previously stored System Partitions & Dependencies 624, and logs System Partition 614 additions and removals. The Project subsystem 606 also uses the Rule Engine 622 subsystem to evaluate the Dependency 618 relationships of the new version of the Software System 608 against the existing Design Rules 626, and logs a list of violations, or the fact that there no violations exist. The Project 606 may then update the Stored Project 610 information, System Partitions & Dependencies 624.

Figure 9:
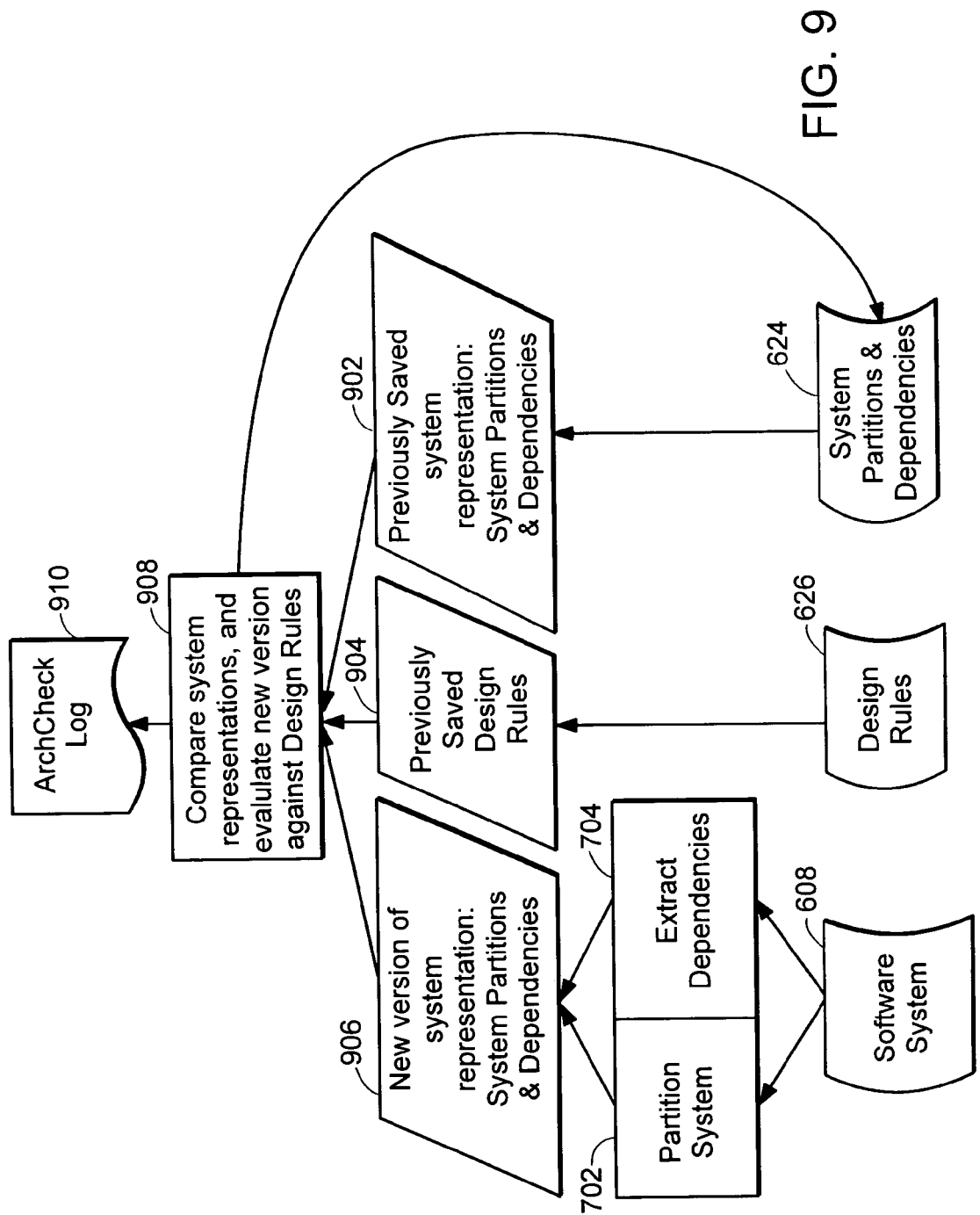
FIG. 9 is a flow chart architectural diagram of ArchCheck.

FIG. 9 illustrates ArchCheck 800 as a flow chart of the information processing of the embodiment. First, the stored version of the System Partitions & Dependencies 624 is read into the in-memory data, Previously Saved System Representation: System Partitions & Dependencies 902. Then the stored version of Design Rules 626 is read into the in-memory data, Previously Saved Design Rules 904.

Then, the Software System 608, which is a new version of the Software System 608 relative to the stored versions in System Partitions & Dependencies 624, is parsed using Partition System 702 and the Extract Dependencies 704. Partition System 702 partitions the Software System 608 to produce an in-memory representation of the System Partitions portion of New Version of System Representation: System Partitions & Dependencies 906. As mentioned previously, software partitions are equivalent to software subsystems. The Extract Dependencies 704 process produces an in-memory representation of the Dependencies portion of the New Version of System Representation: System Partitions & Dependencies 906, for dependencies between different system partitions of the System Partitions portion of New Version of System Representation: System Partitions & Dependencies 906. Together, Partition System 702 and Extract Dependencies 704, produce the New Version of System Representation: System Partitions & Dependencies 906.

Previously Saved System Representation: System Partitions & Dependencies 902, Previously Saved Design Rules 904, and New Version of System Representation: System Partitions & Dependencies 906 as in-memory data are used by the process Compare System Representations and Evaluate New Version Against Design Rules 908 to produce log file ArchCheck Log 910. ArchCheck Log 910 logs information about Partition additions and removals in New Version of System Representation: System Partitions & Dependencies 906 as compared to Previously Saved System Representation: System Partitions & Dependencies 902, and logs the list of violations, or the fact that there were no violations after evaluating Previously Saved Design Rules 904 against New Version of System Representation: System Partitions & Dependencies 906.

The Compare System Representations and Evaluate New Version against Design Rules 908 also writes out a new version of System Partitions & Dependencies 624 based on the New Version of System Representation: System Partitions & Dependencies" 906.

Figure 10:
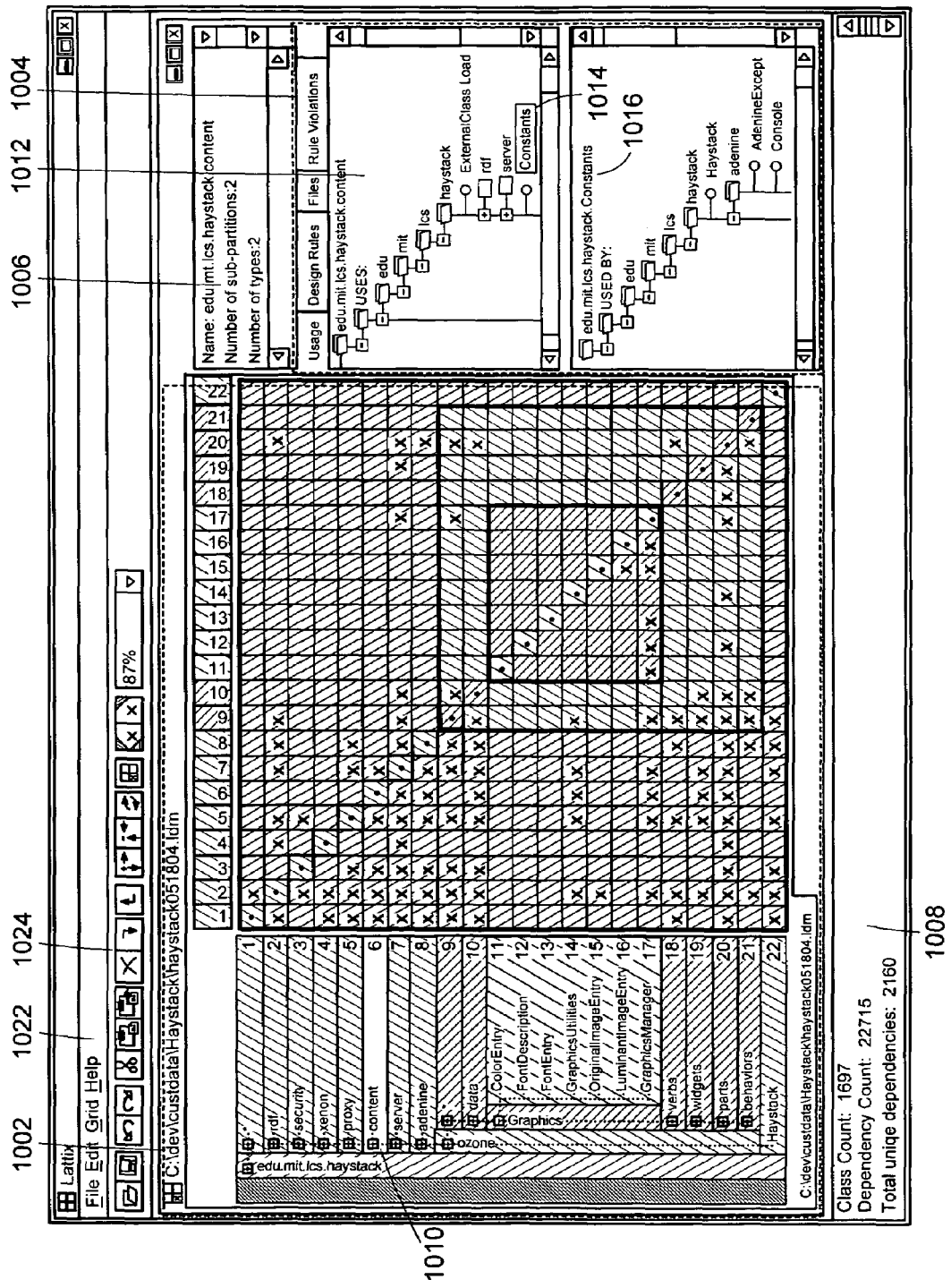
FIG. 10 illustrates a software system DSM shown with a subsystem usage tree from an ArchMap screen shot, all in accordance with an embodiment of the present invention.

FIG. 10 shows a DSM 1002 for a hierarchical software system along with a subsystem usage tree in a usage tab 1012 in a screenshot of the ArchMap computer application, an embodiment of the invention. A menu bar 1022 and a toolbar 1024 for the ArchMap computer application are also shown.

A tab pane 1004 allows viewing and interaction with different information pertaining to the hierarchical software system pictured in the DSM 1002. A subsystem general information pane 1006 displays information about a currently selected "content" subsystem 1010 in the DSM 1002. A messages pane 1008 displays informational messages regarding the operation of ArchMap. In the embodiment of FIG. 10, the messages pane 1008 displays class count, dependency count, and total number of unique dependencies for the hierarchical software system input to the ArchMap computer application.

A usage tab 1012 of the tab pane 1004 contains information about the subsystems used by the subsystem "content". Selection of a subsystem "constants" 1014, a subsystem used by subsystem "content", results in a Used By display 1016 showing all of the subsystems within the hierarchical software system that use the subsystem "constants" 1014, i.e., a "Used By" list for the subsystem "constants" 1014.

Figure 11:
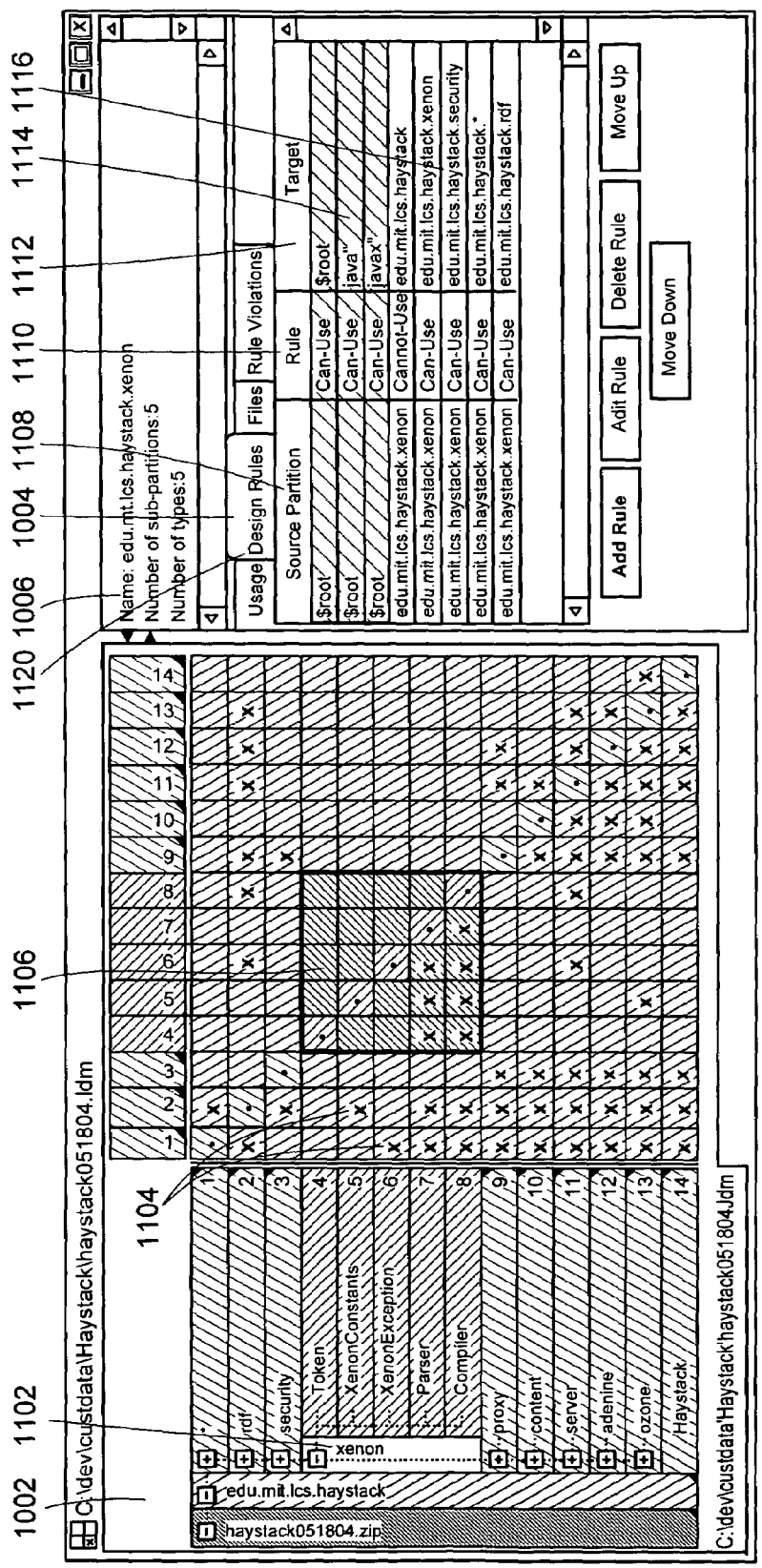
FIG. 11 illustrates a software system DSM shown with design rules in the same embodiment as FIG. 10.

FIG. 11 shows the DSM 1002 of a hierarchical software system along with design rules displayed in the tab pane 1004. A row header "xenon" 1102 is highlighted and also rotated 90 degrees, since subsystem "xenon" is displayed in expanded form (see FIG. 17A). Within DSM 1002, a bordered grouping of cells 1106 corresponds to the subsystems (java classes in this instance) contained within a parent subsystem, "xenon". A dependency mark "X" 1104 in the DSM 1002 shows that the subsystem in the row corresponding to the dependency mark 1104 has a dependency on the subsystem in the column corresponding to the dependency mark 1104. The two dependency marks 1104 indicated show that edu.mit.lcs.haystack.xenon.XenonConstants depends on edu.mit.lcs.haystack.rdf, and that edu.mit.lcs.haystack.xenon.XenonException depends on edu.mit.lcs.haystack..*.

In FIG. 11, tab pane 1004 again allows viewing and interaction with different information pertaining to the hierarchical software system DSM 1002. As in FIG. 10, the subsystem general information pane 1006 displays information about a currently selected subsystem, "xenon" in this case. Here, the tab pane 1004 displays a design rules tab 1120. Design rules tab 1120 contains Design Rules 1114 which are made up of three components. "Source" 1108 corresponds to a subsystem subject of a rule. This may also correspond to a classification of a subsystem (see FIG. 22) subject of a rule. "Rule" 1110 may be of the type, can-use, cannot-use, must-use, etc. "Target" 1112 specifies the subsystem that is the object of the rule, i.e., the object of the relationship constraint such as can-use (allow), cannot-use (disallow), or must-use (assert).

Rules having a gray background 1114 are inherited and cannot be edited from selected subsystem "xenon". Editing of grayed out rules 1114 requires selection of the proper subsystem higher in the system hierarchy. Rules with a white background 1116 are associated with this selected subsystem, "xenon", and may be edited (modified, created, deleted, re-ordered, etc). Generally, rules are inherited from the subsystem in which they are defined by descendents of the subsystem in which the rules were defined. Inherited rules may be overridden in descendent sub-systems by creating an overriding rule local to the descendent subsystem. Rules are evaluated in the order they appear in the Design rules tab 1120 and may be created later in the evaluation sequence that overrides a prior rule. This is useful to create an override for a subset of the subsystems affected by an inherited rule.

Figure 12:
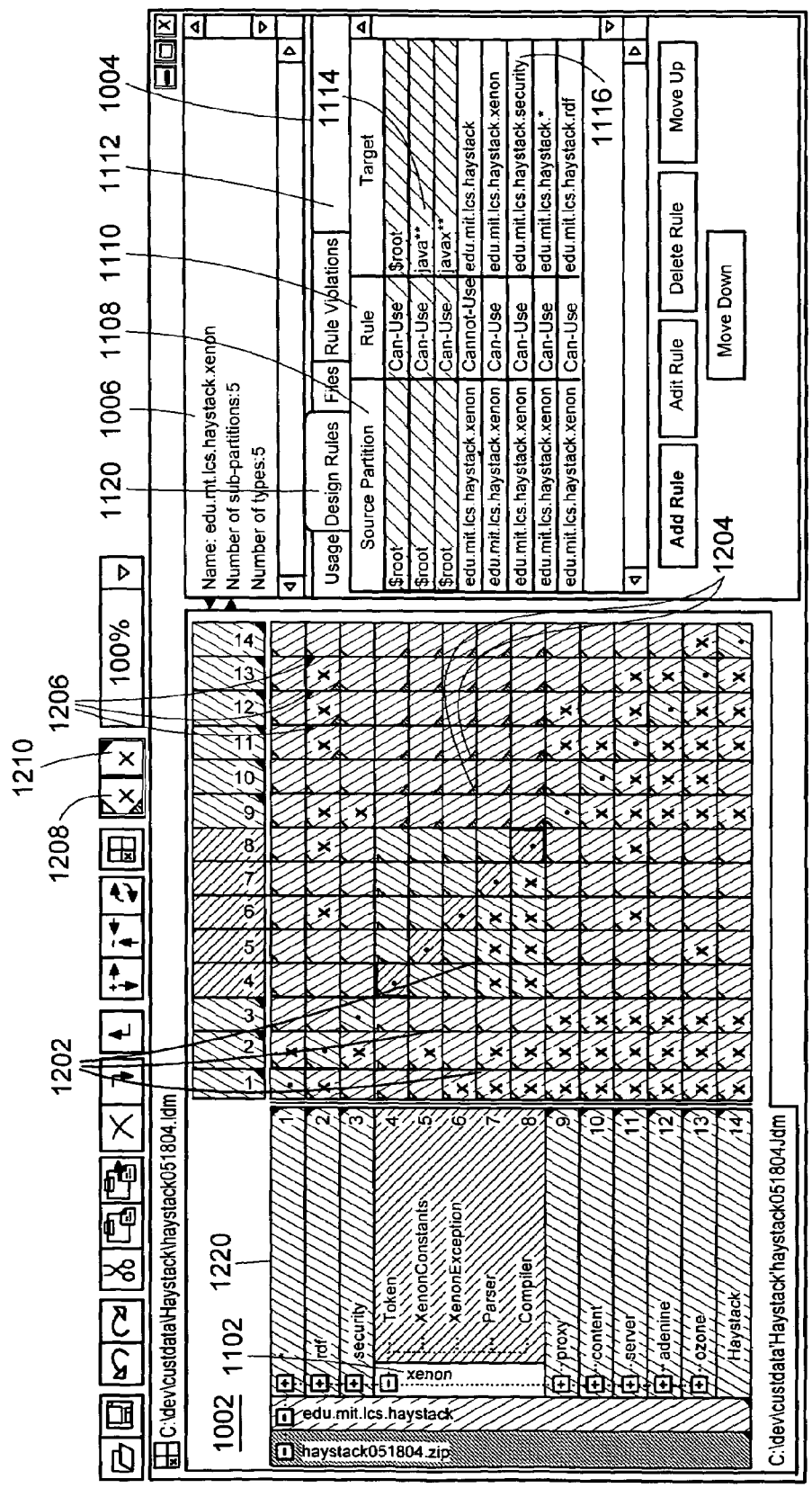
FIG. 12 illustrates the software system DSM of FIG. 10 with design rules and "Rules View"

FIG. 12 shows a software system DSM with design rules and a "Rules View." DSM 1002 contains indicators 1202 visually indicating presence of a design rule affecting a specific dependency relationship, and, in addition, indicating the type of design rule that affects that dependency relationship. Subsystem "xenon" is again selected in the DSM 1002. Design rules pertaining to "xenon" and its ancestors are listed in the tab pane 1004 which is showing design rules in design rules tab 1120.

Cells within software system DSM 1002 contain triangles in one or more corners of the cells. Row header cells 1220 contain triangles when there is a violation regarding the use of an external system. A triangle in the upper left corner of a cell 1202 indicates presence of a rule allowing (can-use) a dependency. "Can-use" indicator triangles may also be displayed in green when color is available. A triangle in the lower left corner of cell 1204 indicates presence of a rule disallowing (cannot-use) a dependency. "Cannot-use" indicator triangles may also be displayed in yellow when color is available.

Indicators of violations of design rules 1206 apply when a "cannot-use" rule is applicable to a dependency and there is, in fact, a dependency as shown by a dependency mark in the cell. A triangle in the upper right corner triangle indicates presence of a design rule violation in this cell. Design rule violation indicator triangles may also displayed in red when color is available. In a dependency cell with a violation, both the lower left corner cannot use indicator and the upper right design rule violation indicator are displayed.

Toolbar button 1208 may turn the display of can-use and cannot-use indicator triangles on and off. Toolbar button 1210 may turn the display of design rule violation indicator triangles on and off.

Figure 13A:
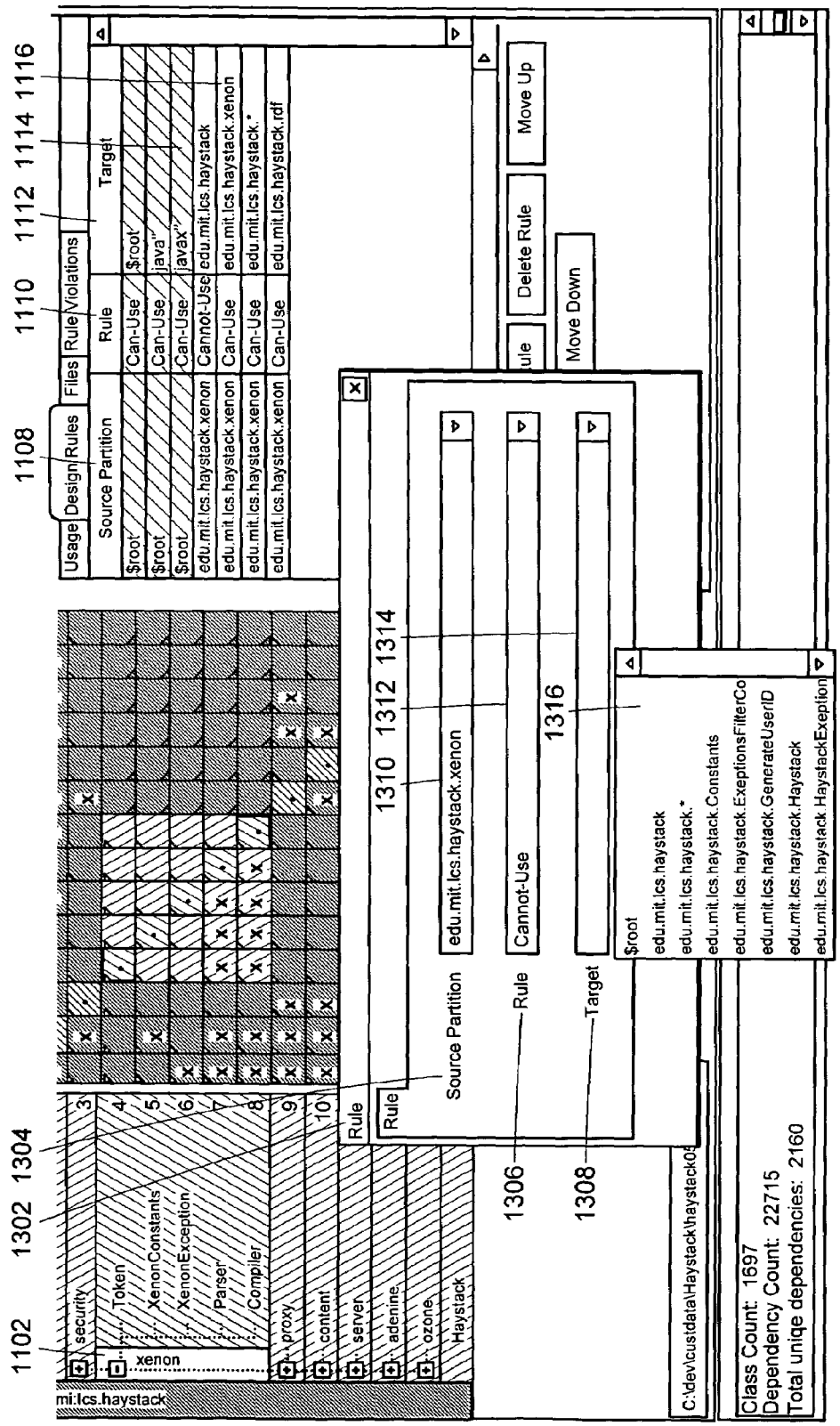
FIGS. 13A and 13B illustrate design rule editing suitable for use with the embodiment of FIG. 10.

FIG. 13A shows a dialog for editing design rules, depicting the ArchMap computer application in the same state as shown in FIG. 11 and FIG. 12. Rule editing dialog 1302 shown in front includes rule creation and rule modification. "Source" 1304 is the label for the source subsystem (partition) 1310 to which the rule to be edited applies, i.e., source subsystem edu.mit.lcs.haystack.xenon in this case. "Rule" 1306 is the label for a rule verb 1312 for the rule being edited, i.e., cannot-use in this case. Examples of rule verbs are can-use, cannot-use, must-use, etc. "Target" 1308 is the label for a target subsystem 1314 to which the rule verb applies. Dropdown list 1316 shows that the target subsystem 1314 may be selected from a dropdown list of the hierarchical software system or of externally used subsystems. Entry into the rule editing dialog 1302 may be done manually as well as by selection from a dropdown list.

Figure 13B:
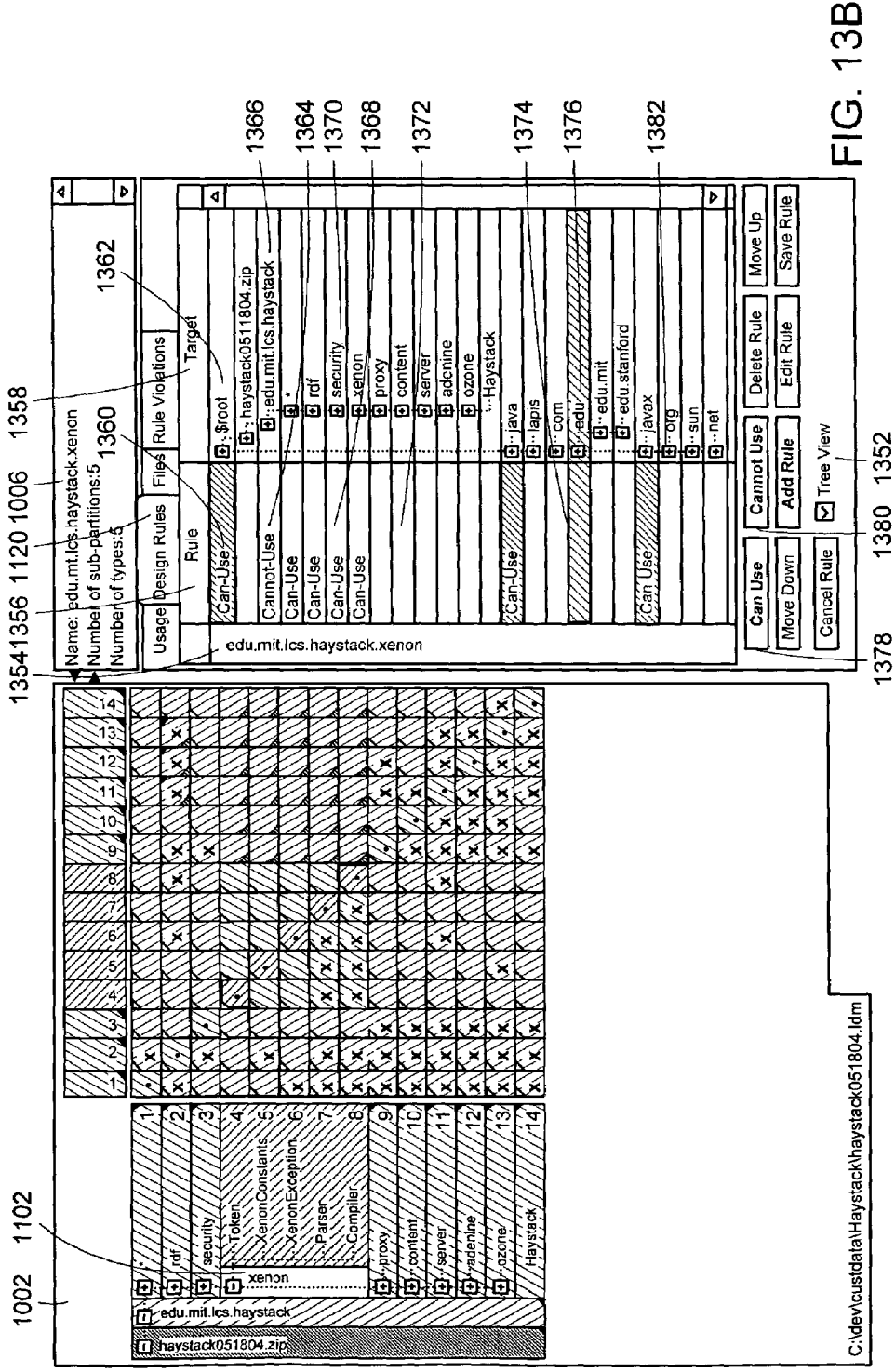

FIG. 13B shows another user interface for editing design rules, depicting the ArchMap computer application in the same state as shown in FIG. 11, FIG. 12, and FIG. 13A. In the design rules tab 1120, a checkbox toggle, Tree View 1352, may be shown. If the Tree View 1352 checkbox is checked, then the design rules tab 1120, displays a column with rotated text 1354 indicating the source subsystem to which the rules will apply, a column for Rule 1356 which contains the rule verbs for specific verbs, and a column with rule Target 1358 which contains a tree control of the subsystems that may be specified as targets of a rule. Items in the Rule 1356 column may contain a rule verb, or may be blank 1372. Gray background 1360 on a rule verb indicates that from the perspective of this subsystem, edu.mit.lcs.haystack.xenon 1354, this rule is inherited and may not be edited from the subsystem selected 1102.

The toplevel subsystem in this system, $root, is shown 1362 expanded. The user interface of FIG. 13B shows the same rules as depicted in FIG. 13A. For example, edu.mit.lcs.xenon Cannot-Use 1364 the subsystem edu.mit.lcs.haystack 1366. The higher scope rule in 1364 and 1366 is overridden by several more precisely scoped rules. For instance, the Cannot-Use 1364 is overridden with a Can-Use 1368 rule for edu.mit.lcs.haystack.security 1370.

A row in the Tree View 1354 design rules tab 1120 may be selected such that the rule verb field 1374 and the rule target field 1376 are selected. Once selected, the ArchMap computer application user may create or modify a rule applying to the selection by pressing one of the buttons, Can-Use 1378 or Cannot-Use 1380. In the Target 1358 column, the hierarchical tree shown may be expanded and collapsed by clicking on the icons 1382 to the left of the subsystem name, allowing the ArchMap computer application user to create rules at the most appropriate level of subsystem hierarchy. As shown by the override Can-Use 1368 rule for edu.mit.lcs.haystack.security 1370, rules are inherited down from subsystems higher in the hierarchy to their descendents, but may be overridden as in 1368 and 1370 to create rules with a more precise scoping.

Figure 14:
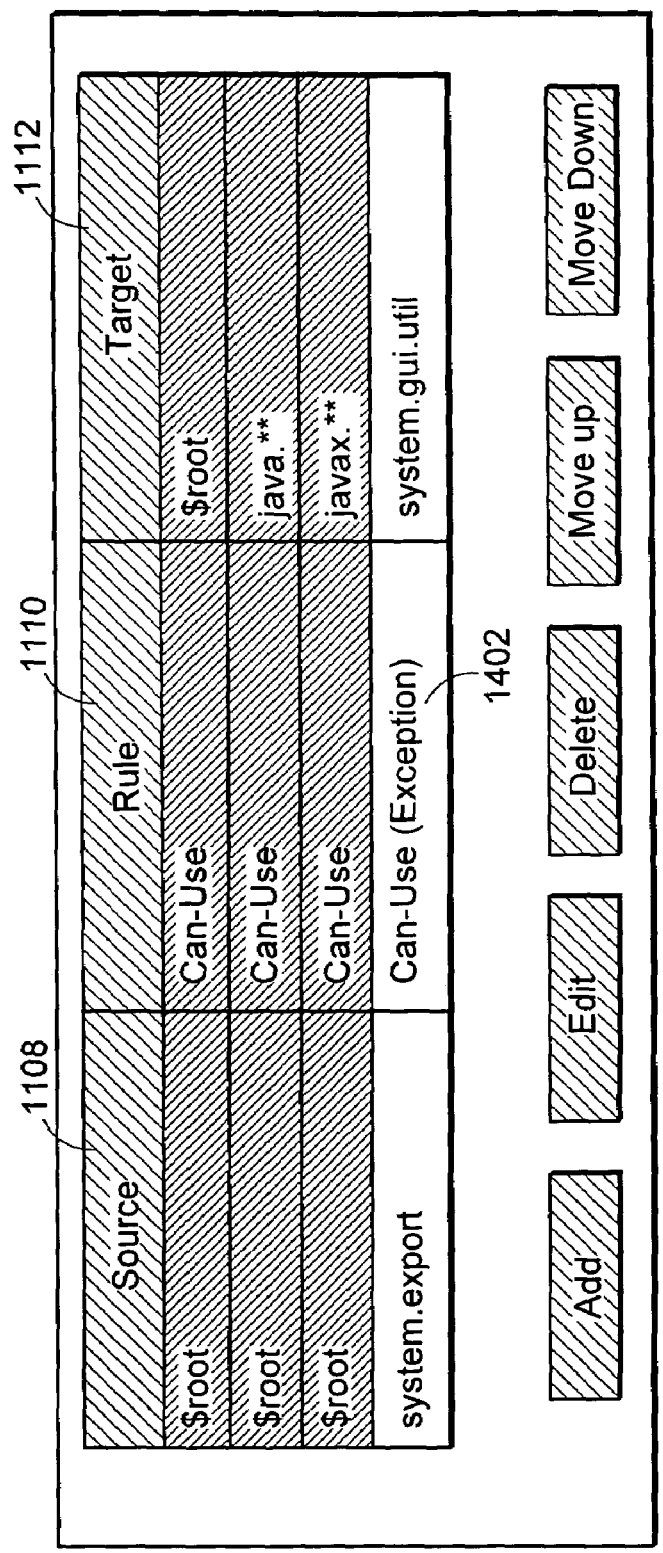
FIG. 14 illustrates implementation of exception rules for the same embodiment.

FIG. 14 shows an example of an exception rule. This is a design rule where a specific dependency relationship is allowed, but the architect is identifying this allowance as an exception to what the actual design intent is for these two subsystems. "Can-use" rule 1402 shows such an allowed, but undesired dependency, labeled as an exception. Exceptions are a mechanism whereby architects may mark an architecturally unsound dependency as an exception. This communicates the undesirable nature of the dependency, but removes it from rule violation lists.

Figure 15:
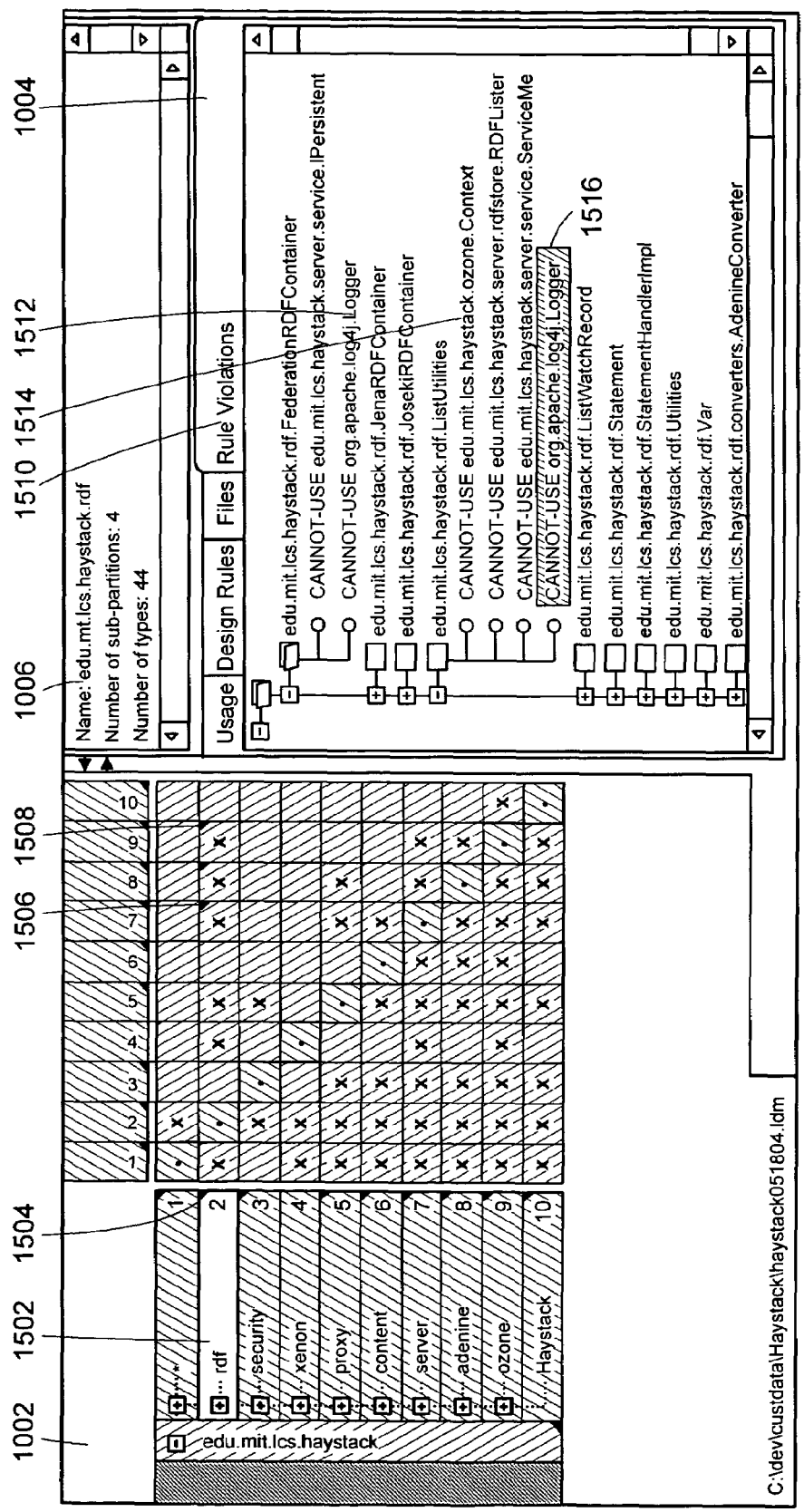
FIG. 15 illustrates a software system DSM in accordance with the embodiment of FIG. 10 shown with rule violations.

FIG. 15 shows a software system DSM 1002 with rule violations displayed in the tab pane 1004. Subsystem "rdf" 1502 is selected in the software system DSM 1002. Triangle 1504 in the upper right corner of the row header cell for subsystem "rdf" indicates that there is a design rule violation for "rdf" and its use of external systems. In this context, external systems are systems or subsystems outside of those shown in the software system DSM 1002, but used or referenced by the subsystems that are shown in the software system DSM 1002. For example, all of the referenced Java runtime subsystems (java.**) would be considered an external system. If color is available, the design rule "violation" indicator triangles may also be displayed in red. Indicator triangles 1506 and 1508 show violations in the dependency relationships between specific subsystems. Rule violation indicator triangle 1506 indicates that subsystem edu.mit.lcs.haystack.rdf should not have a dependency on subsystem edu.mit.lcs.haystack.server, but, in fact does have such a dependency. Rule violation indicator triangle 1508 indicates that subsystem edu.mit.lcs.haystack.rdf should not have a dependency on subsystem edu.mit.lcs.haystack.ozone, but, in fact does have such a dependency.

Rule violations tab 1510 displayed in the tab pane 1004 contains violations 1512 in a subsystem that depends on an external subsystem. In this example, the subsystem, edu.mit.lcs.haystack.rdf, violates a design rule where it depends upon the external subsystem, org.apache.log4j.Logger. Specifically the violation is caused by edu.mit.lcs.haystack.rdf.FederationRDFContainer having a dependency upon org.apache.log4j.Logger. Violation 1514 indicates a violation in a subsystem that depends on another subsystem within the overall system. In this example, the subsystem, edu.mit.lcs.haystack.rdf, violates a design rule where it depends upon the subsystem edu.mit.lcs.haystack.ozone.Context. Specifically the violation 1514 is caused by edu.mit.lcs.haystack.rdf.ListUtilities having a dependency upon edu.mit.lcs.haystack.ozone.Context.

Violation 1516 indicates that individual violations may be selected in the rule violations tab 1510. Once selected, the user of the ArchMap computer application may then add a rule that would allow this dependency, or allow an exception that would allow this dependency by right-clicking on violation 1516 and choosing from a menu that allows creation of a can-use rule or creation of an exception to a cannot-use rule. In this example, the highlighted violation is caused by a dependency that edu.mit.lcs.haystack.rdf.ListUtilities has on the external subsystem, org.apache.log4j.Logger.

Other features include the ability to click on the cells such as the ones indicated by 1506 and 1508. When an individual cell in DSM 1002 such as 1506 or 1508 is clicked on, only the violations associated with the two subsystems that intersect at that cell are displayed in the rule violations tab 1510. In the case of cell 1506, the two subsystems are edu.mit.lcs.haystack.rdf and edu.mit.lcs.haystack.server.

FIG. 16 shows a software system DSM 1602 in one window and a java source-file editor 1604, in an editor window. edu.mit.lcs.haystack.xenon.Token 1606 is selected, i.e., highlighted, in the DSM 1602 pane. Source-file for the class Token, Token.java 1608 is displayed in the java source-file editor adjacent to the DSM pane 1602. An ArchMap computer application user may drill down through the system hierarchy all the way down to the source code of the classes of a system. In this example, class is the smallest subsystem in the software system DSM 1602. However, for a system implemented in the C language, the smallest subsystem chosen would be the file (e.g. file.c).

Figure 17A:
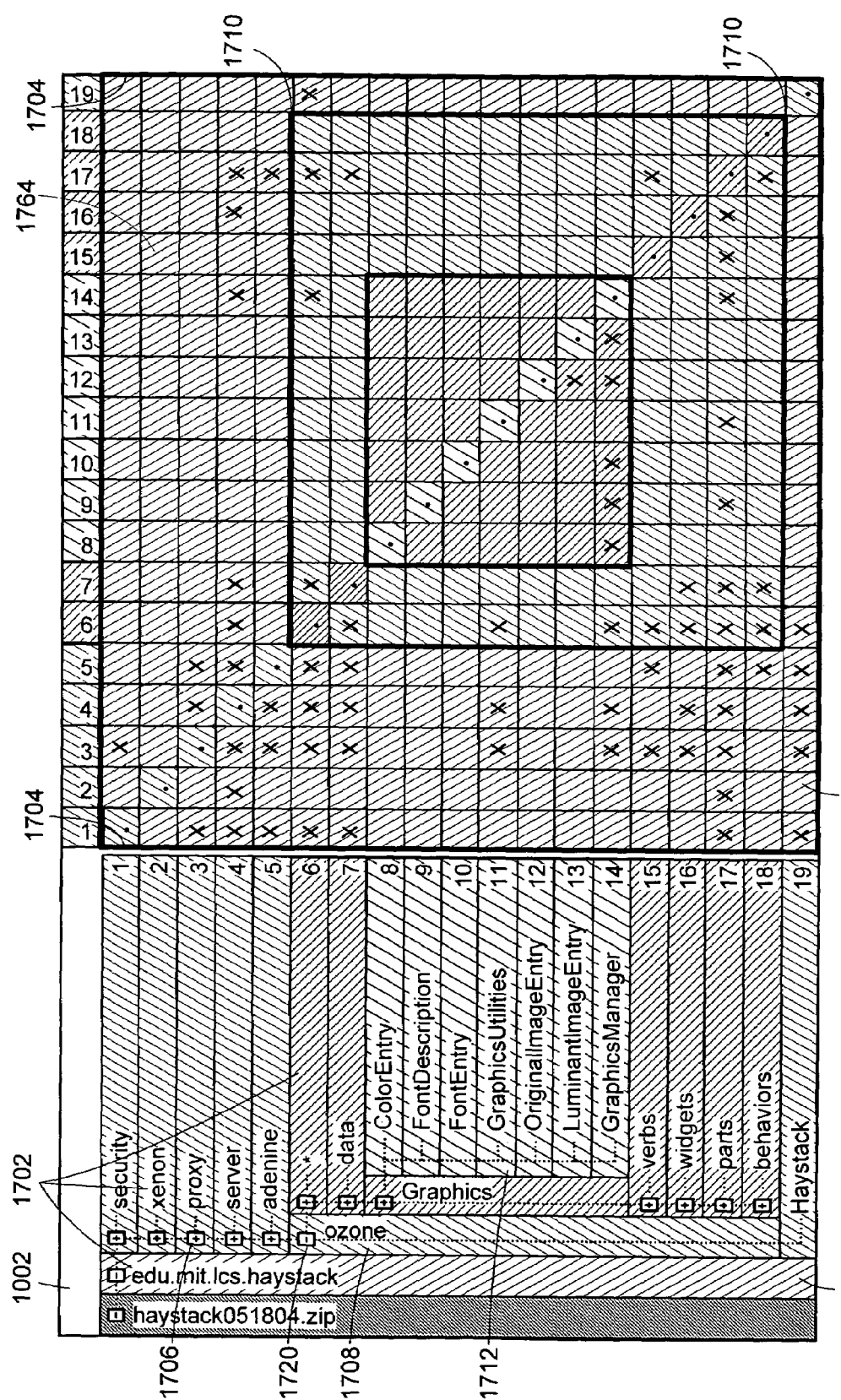
FIGS. 17A-D illustrate a multilevel DSM rendering in accordance with the embodiment of FIG. 10.

FIG. 17A is a rendering of a multi-level DSM, where DSM 1002 is depicted in a hierarchical fashion. Each row header 1702 at the left of the hierarchical DSM 1002 represents a specific subsystem. Dependency cells 1704 on the right indicate existence of a dependency between the two subsystems whose row and column intersect at that cell. "Plus" icon 1706 before the name of a subsystem indicates that the subsystem has descendent subsystems. "Minus" icon 1720 indicates that the direct children of this subsystem are being displayed.

Row header cell 1708 is rotated 90 degrees such that it now spans the number of children subsystems that are now displayed. In this example, subsystem "ozone" (edu.mit.lcs.haystack.ozone) is displayed with header cell 1708 rotated 90 degrees. Subsystem descendents of "ozone" are displayed to the right of the rotated ozone header cell 1708. Subsystem boundary 1710 encloses the "ozone" dependency cells. The area of the DSM enclosed by boundary 1710 has a darker border and is shaded differently (see FIG. 17B).

Expanded subsystem "ozone" does not have its own row or column to show dependency relationships. Instead, the dependency relationships shown are the more granular relationships of its subsystem descendents. When subsystem "ozone" is collapsed, representation of "ozone" corresponds to a single line and to a single column. All of the dependencies for the rows corresponding to the rows in the boundary 1710 are aggregated into that single row. The collapsed row for "ozone", with the now aggregated dependencies from the descendents of "ozone", shows as a dependency of "ozone" on other subsystems such as "proxy", "xenon", and "adenine" in this example where any descendent of "ozone" had a dependency. Similarly, any dependency on a descendant within the columns corresponding to the columns in the boundary 1710 shows as a dependency in the collapsed (aggregated) column. Subsystem 1712 illustrates a DSM expanded to the 5$^{th}$ level at the deepest expanded point for this example. Level 1 is "haystack051804.zip", level 2 is "edu.mit.lcs.haystack", level 3 is "ozone", and level 4 is "graphics", and level 5 is comprised of the children subsystems of "graphics". The ArchMap computer application can support an arbitrary number of levels of hierarchy.

Figure 17B:
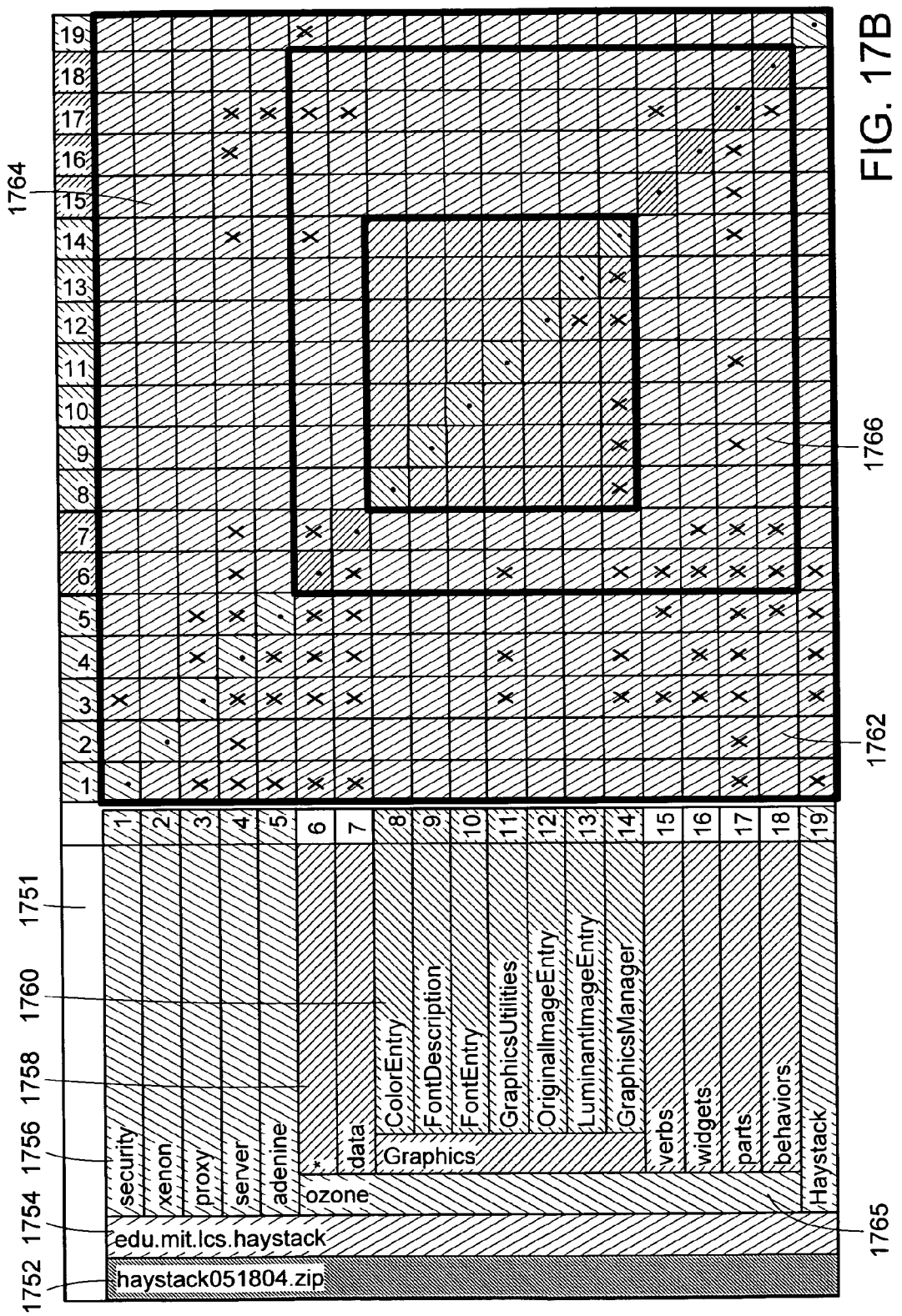
Figure 17C:
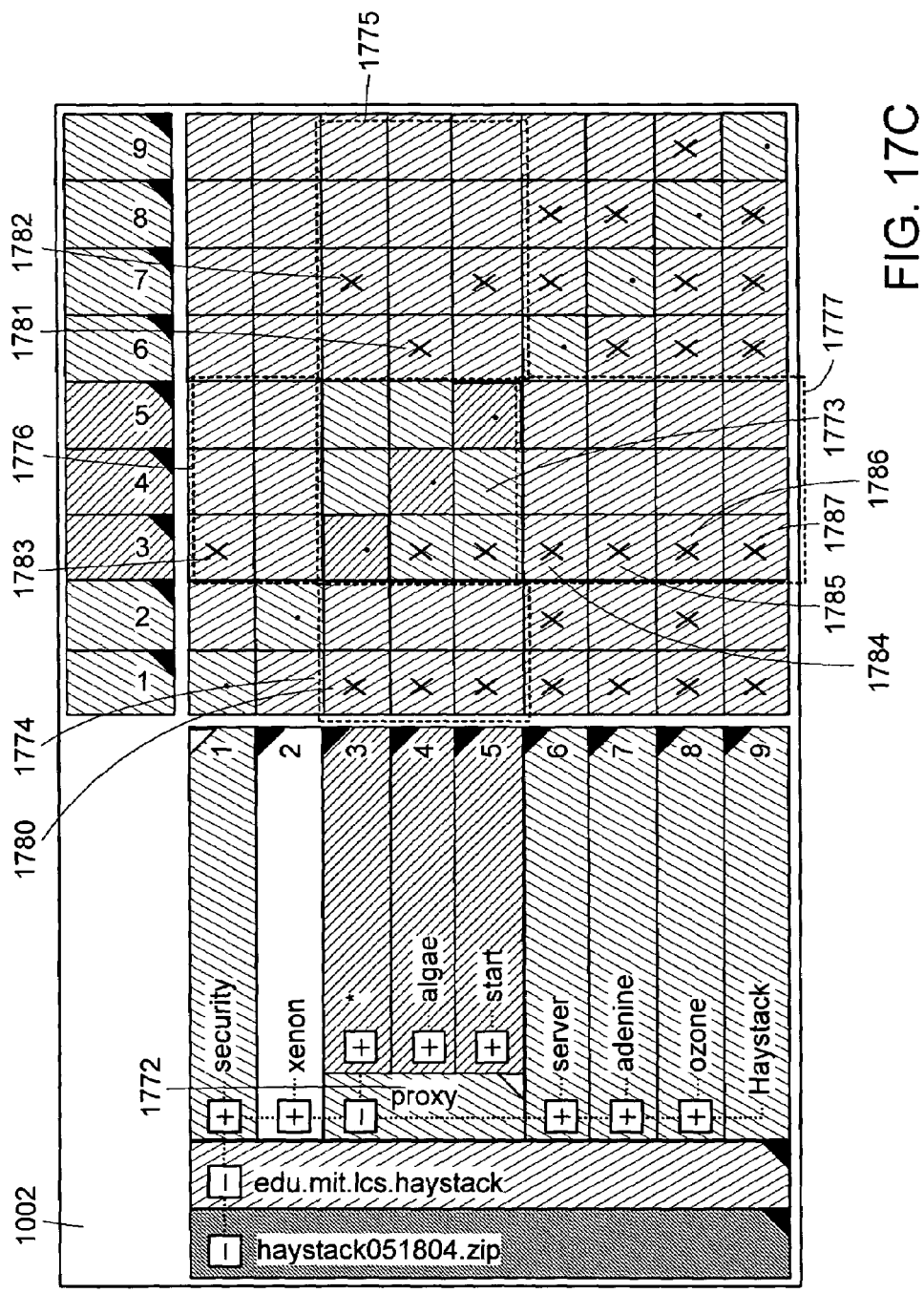
Figure 17D:
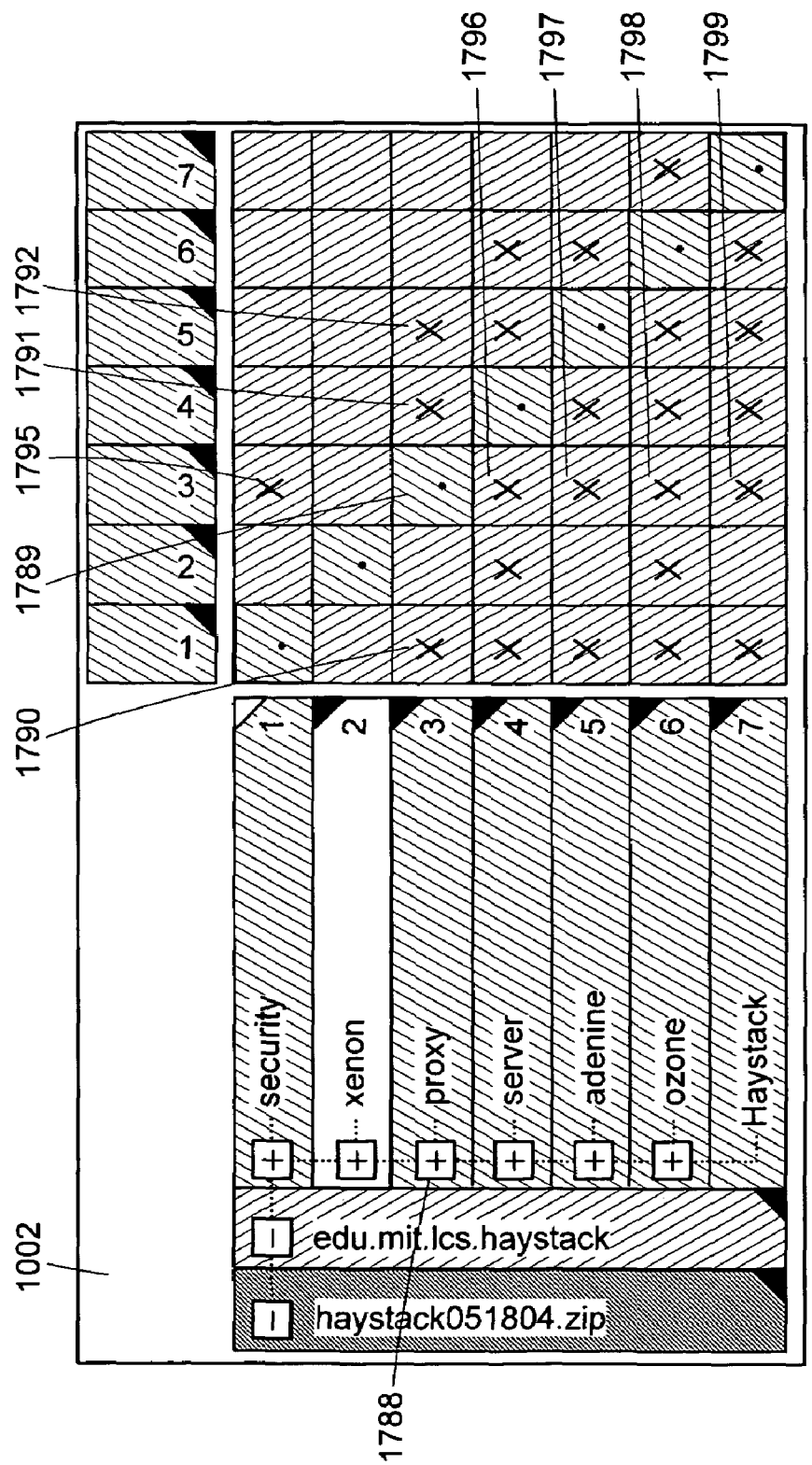

FIGS. 17C and 17D provide additional information regarding aggregation and splitting of dependencies when subsystems are collapsed or expanded. FIG. 17C also describes edu.mit.lcs.haystack in the software system DSM 1002. The subsystem, "proxy" is expanded, and the rotated row header for proxy 1772 corresponds to the bordered and shaded area 1773. There is no row or column for expanded subsystem "proxy" to show dependency relationships. Instead, the dependency relationships shown are the more granular relationships of its subsystem descendents. The six cells indicated by 1774 and the twelve cells indicated by 1775 show the dependencies that the children subsystems of "proxy" have on the visible subsystems outside of "proxy". For example, the dependency of "proxy.*" on "security" is shown by 1780, the dependency of "proxy.algae" on "server" is shown by 1781, and the dependency that "proxy.*" has on "adenine" is shown by 1782. When collapsed, all of these dependencies will be aggregated such that when "proxy" is shown with only a single row and column, the row will indicate a dependency on each of "security", "server", and "adenine."

The six cells indicated by 1776 and the twelve cells indicated by 1777 show that the children subsystems of "proxy" are depended upon by one of the visible subsystems outside of "proxy". Specifically, in this example, the other subsystems that depend on "proxy.*" include "security" 1783, "server" 1784, "ozone" 1785, "adenine" 1786, and "Haystack" 1787. There exists a dependency coupling, or cycle, in the dependency relationships where, for example, "proxy" depends on "security" and "security" depends on "proxy."

In FIG. 17D, the software system DSM 1002 of FIG. 17C is shown with "proxy" collapsed 1788. As described above, "proxy" now shows the dependencies aggregated from its descendents. The collapsed "proxy" has a dependency on "security" 1790, "server" 1791, and "adenine" 1792 and shows an aggregation of the dependency relationships where other systems are dependant on "proxy", specifically "security" 1795, "server" 1796, "ozone" 1797, "adenine" 1798, and "Haystack" 1799. The shaded area of expanded "proxy" 1773 is now depicted as a single cell with a period or dot 1789, indicating that all of the previously expanded dependencies of the children of "proxy" on each other, now fall into the category of a dependency on itself and are no longer of interest in this view.

The ArchMap computer application also supports editing of the structural relationships shown in the hierarchical DSM 1002 where subsystems may be created, deleted, renamed, aggregated, split, and moved. In the example of FIG. 17A, an ArchMap computer application user may create a subsystem as a direct child of "edu.mit.lcs.haystack" called "newsub", may delete a subsystem such as "edu.mit.lcs.haystack.xenon", and may cut "ColorEntry", "FontEntry" and "FontDescription" from subsystem "edu.mit.lcs.haystack.ozone-.graphics" and then paste them into "edu.mit.lcs.haystack.newsub" where the dependencies associated with "ColorEntry", "FontEntry", and "FontDescription" move with these subsystems to any new location in the DSM 1002.

Further, the "edu.mit.lcs.haystack" subsystem "security" may be split into two subsystems, "security1", and "security2", placing portions of the descendents of "security" into "security1" and the remaining descendents into "security2". The dependencies of the subsystems moved from "security" into "security1" move with the subsystems into "security1", and the dependencies of the subsystems moved from "security" into "security2" would move with those subsystems into "security2." The subsystems "edu.mit.lcs.haystack.ozone.parts" and "edu.mit.lcs.haystack.ozone.widgets" may be aggregated into another new subsystem "edu.mit.lcs.haystack.ozone.items" where the dependencies of "parts" and "widgets" also move into "items".

These editing features are useful for many purposes. For example, "what-if" changes may be made to a system's architecture that may allow a user to examine potential changes to determine impact on the architecture. The concrete architecture may be adjusted to better match the conceptual architecture. A map of a system yet to be built may be created and the DSM model used for forward engineering of a system.

FIG. 17B shows a multilevel or hierarchical DSM 1751 where cells corresponding to levels in the hierarchy have visual indicators of their level. The hierarchical DSM 1701 in FIG. 17B is identical to the hierarchical DSM 1002 in FIG. 17A except that hierarchical DSM 1701 shows the hierarchical levels with patterns rather than colors. Subsystem 1752 is at level one, as indicated with a solid white background. Subsystem 1754 is at level 2, as indicated with by a pattern of sparse dots on a white background. A number of dependency cells 1764 are also at level 2 in the hierarchy. In this case, dependency cells 1764 and 1762 are directly part of the subsystem 1754. Subsystem 1756 shows level 3, where level 3 is indicated with by a pattern of diagonal lines on a white background. Subsystem 1758 shows level 4, where level 4 is indicated with by a pattern of denser dots on a white background. Subsystem 1760 shows level 5, where level 5 is indicated with by a pattern of reverse diagonal lines on a white background. Comparison between subsystem 1754 and cell 1762 again shows that all level 2 cells have the same pattern of sparse dots on a white background. The similar patterning between subsystem 1754 and cell 1762 emphasizes that the subsystem "edu.mit.lcs,haystack" 1754 arrayed as a header cell with the sparse dots on white background is the same level as the dependency cells 1762 with the same sparse dots on white background. More specifically, cells 1762 are the dependency cells displayed for level 2 in the hierarchy. Comparison of cell 1766 and subsystem 1765 shows that the level 3 cells, both header and dependency cells, have the same pattern—diagonal lines on a white background. When color is available, each of these levels has a unique color displayed as the background of the cells at that level. In the ArchMap computer application, users may set the level colors as part of a set of preferences.

Figure 18:
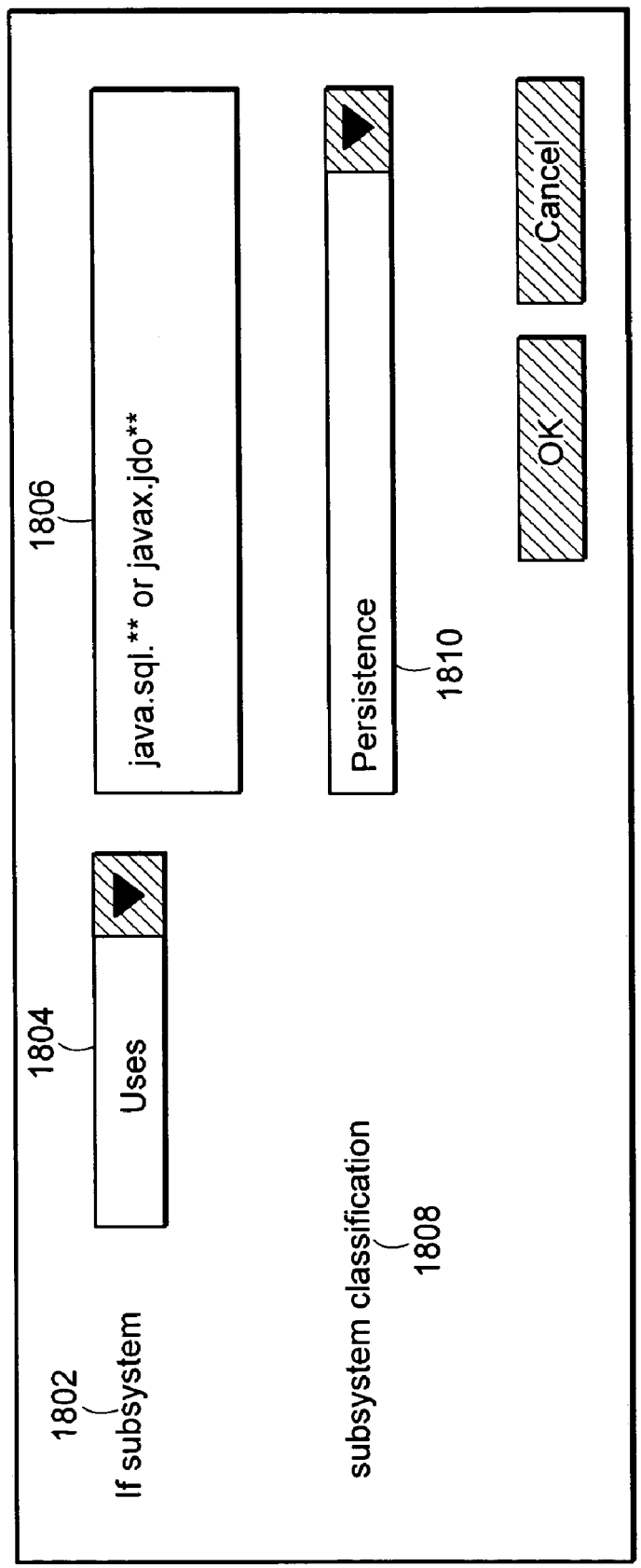
FIG. 18 illustrates a definition of software subsystem classification criteria for "persistence" in accordance with an embodiment of the present invention.

FIG. 18 shows an example of defining a software subsystem classification based on criteria. In this example, the subsystem classification defined is called "persistence", but may be any arbitrarily defined classification name. The criteria begin with the conditional "If Subsystem" 1802. The conditional operator 1804, in this case, is "uses". Use of specific other subsystems 1806 establishes subsystem 1802 as meeting the criteria for this specified classification. In this example, the other subsystems are "java.sql." or "javax.jdo.". Label 1808 identifies a field 1810 containing the textual name of the classification meeting the criteria. The field 1810 itself contains the textual name of the classification meeting the criteria defined. The field 1810 may be a dropdown list of previously defined classifications, or the user of the ArchMap computer application may type in a new classification name. In this example, the classification defined is "Persistence".

Figure 19:
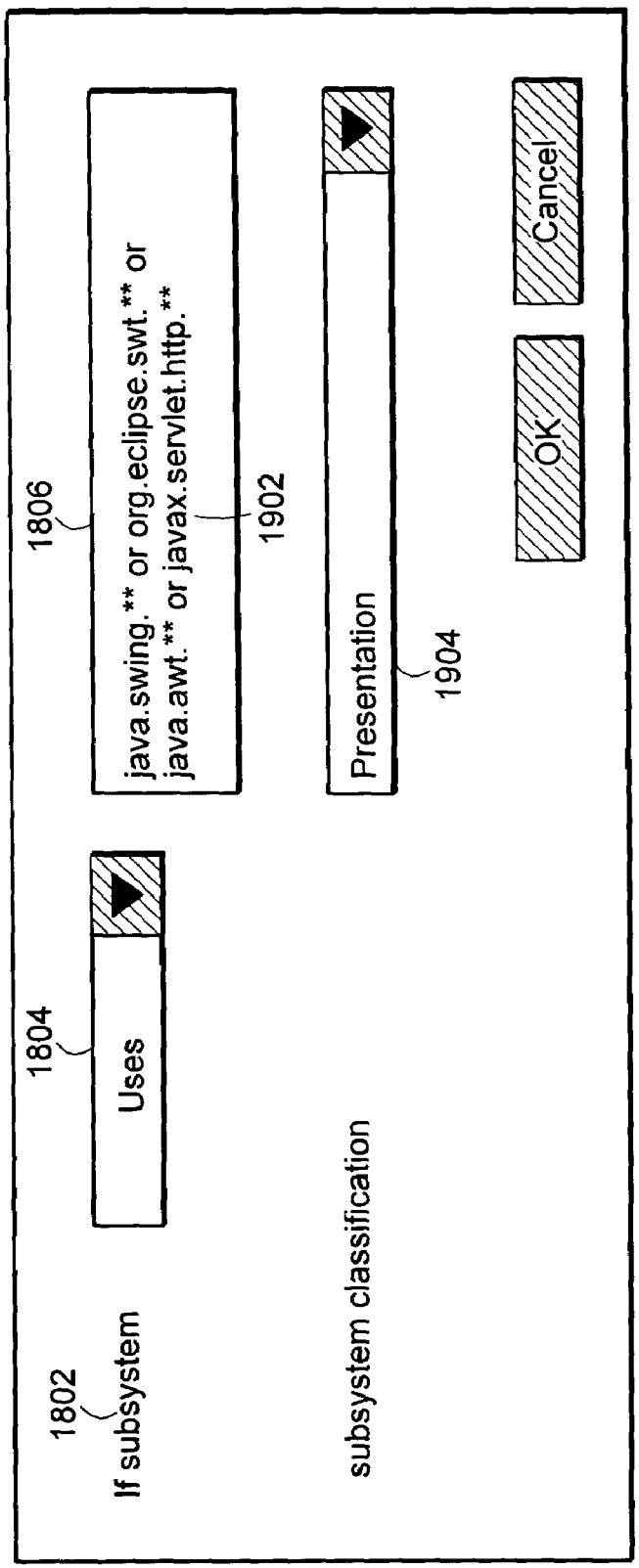
FIG. 19 illustrates a definition of software subsystem classification criteria for "presentation" in accordance with an embodiment of the present invention.

FIG. 19 shows a second example of defining a software subsystem classification based on criteria. In this example, the subsystem classification defined is called "Presentation", but may be any arbitrarily defined classification name. The criteria begin with the conditional "If Subsystem" 1802. A conditional operator 1804, in this case, is "uses". Use of specific other subsystems 1902 establishes the subsystem as meeting the criteria for this specified classification. In this example, those other subsystems are "java.swing." or "org.eclipse.swt." or "java.awt." or "javax.servlet.http.". A field 1904 contains the textual name of the classification meeting the criteria defined for this specific example. In this example, the classification defined is "Presentation".

Figure 2A:
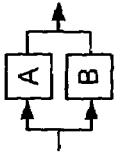
FIGS. 2A and 2B provide a comparison between a graph representation and a DSM representation of relationships between two subsystems in accordance with the prior art.
Figure 2B:
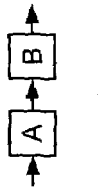
Figure 3B:
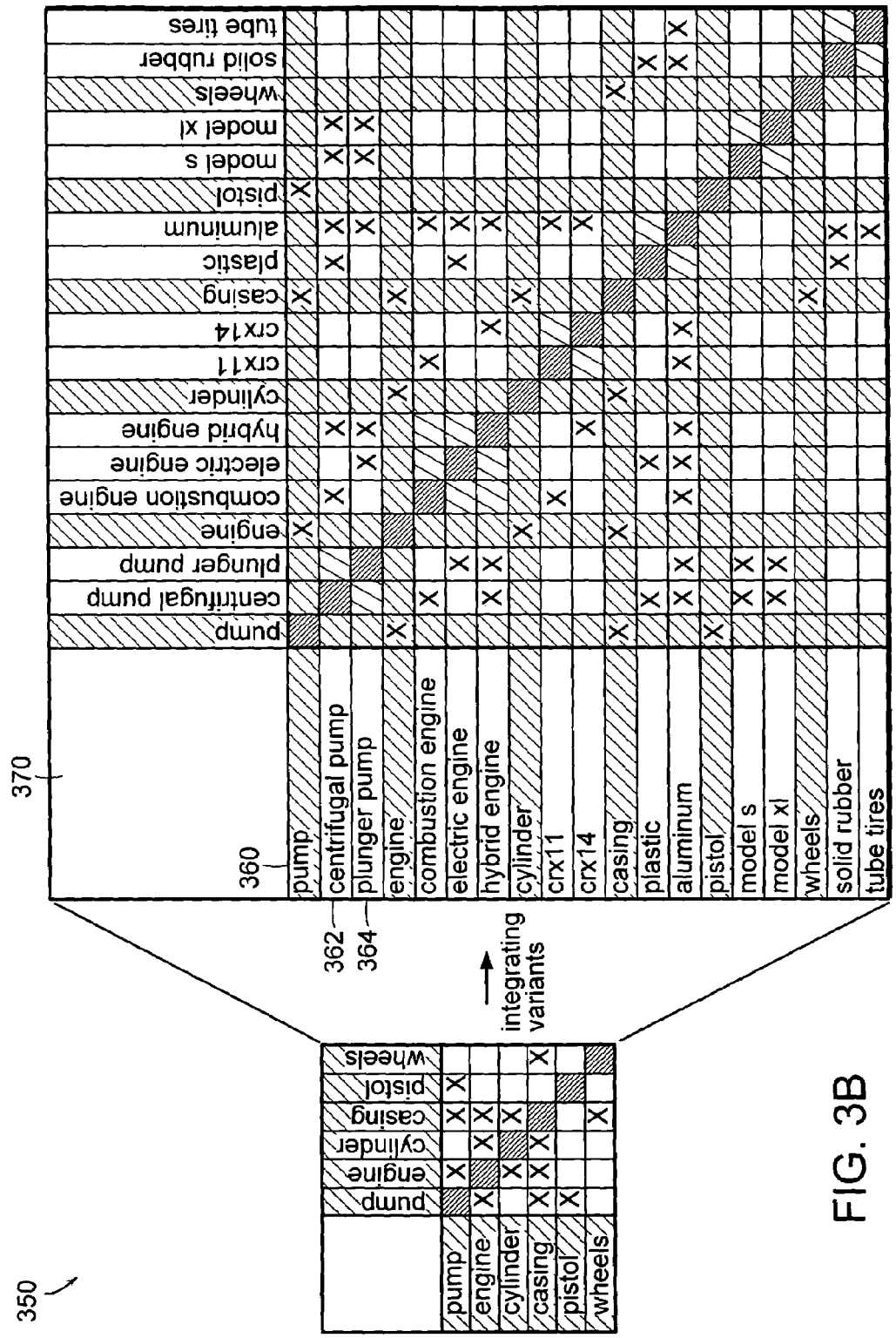
Figure 4:
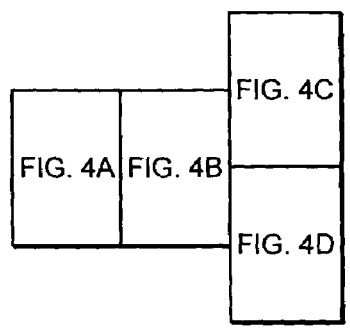
FIG. 4 is a prior art DSM series showing multiple level as a series of separate yet related DSMs from Sabbaghian et al. (1998)
Figure 4A:
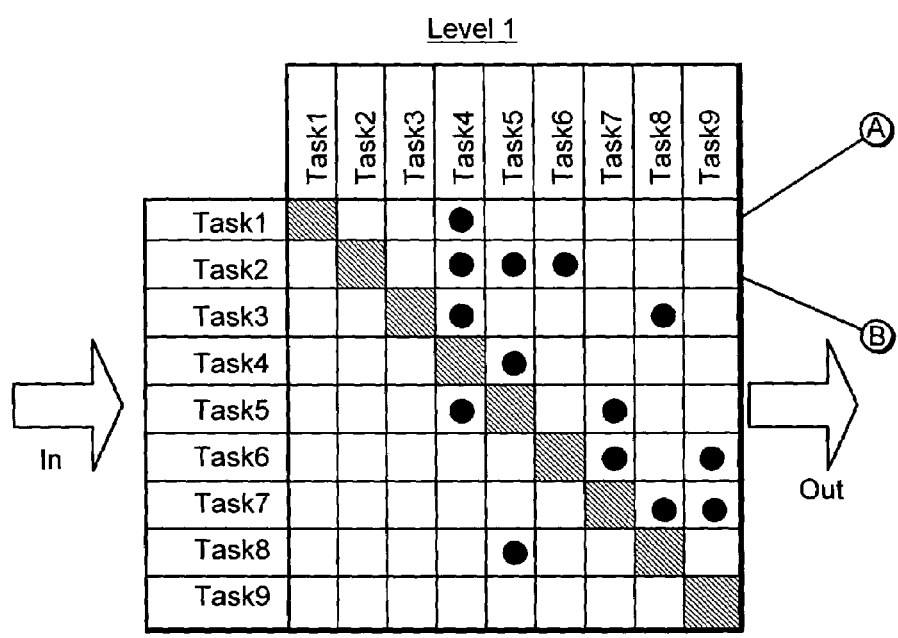
Figure 4B:
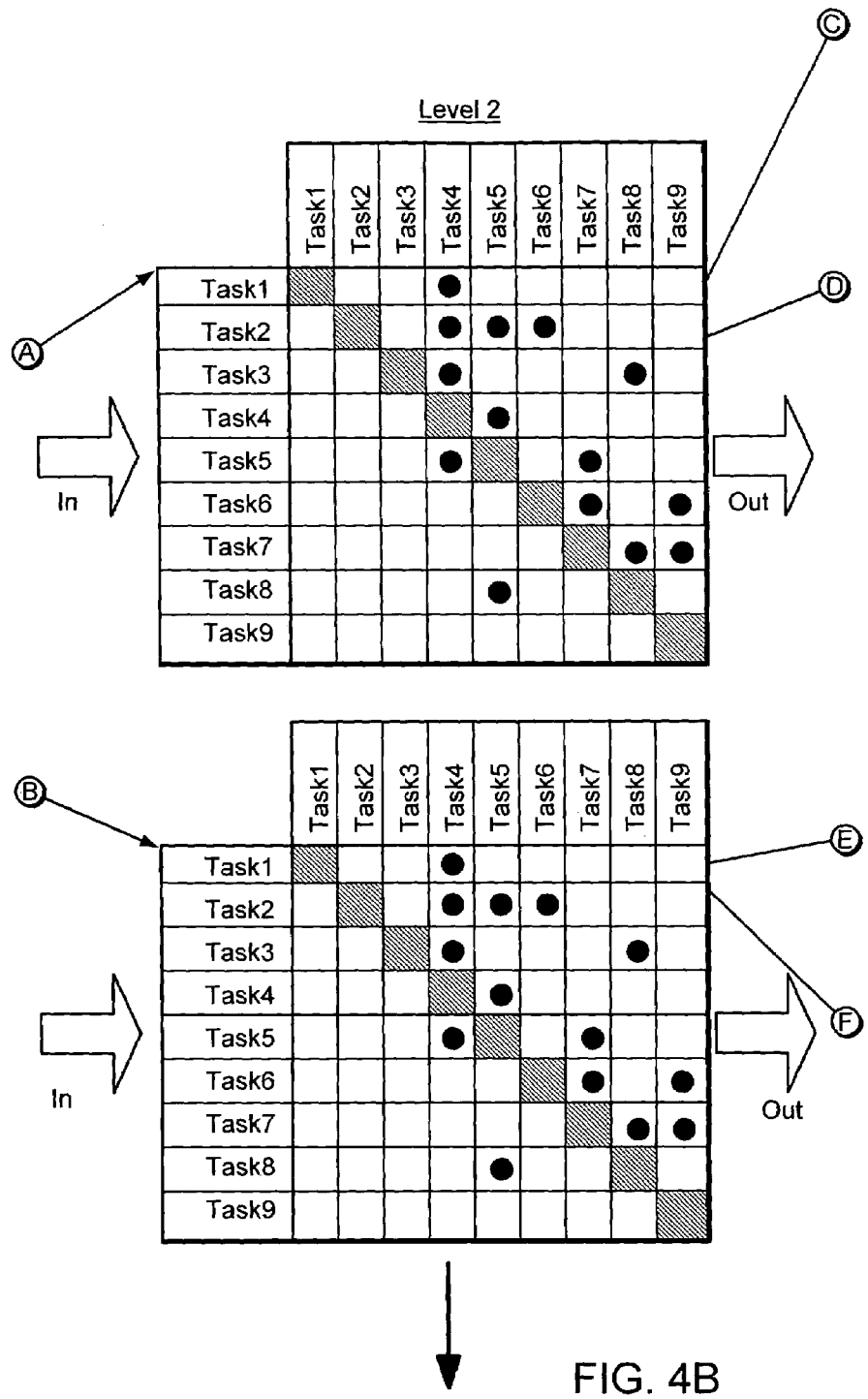
Figure 4C:
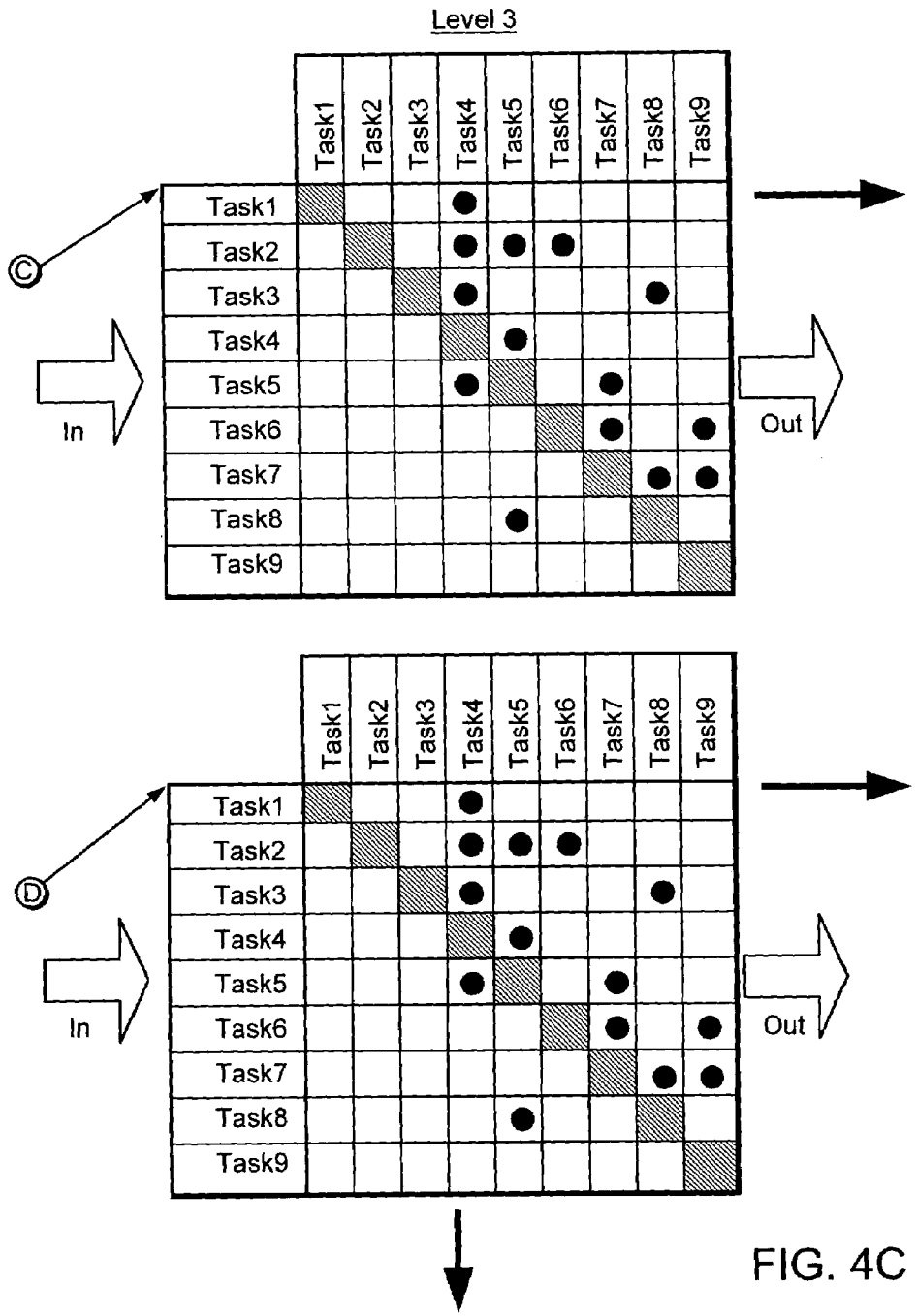
Figure 4D:
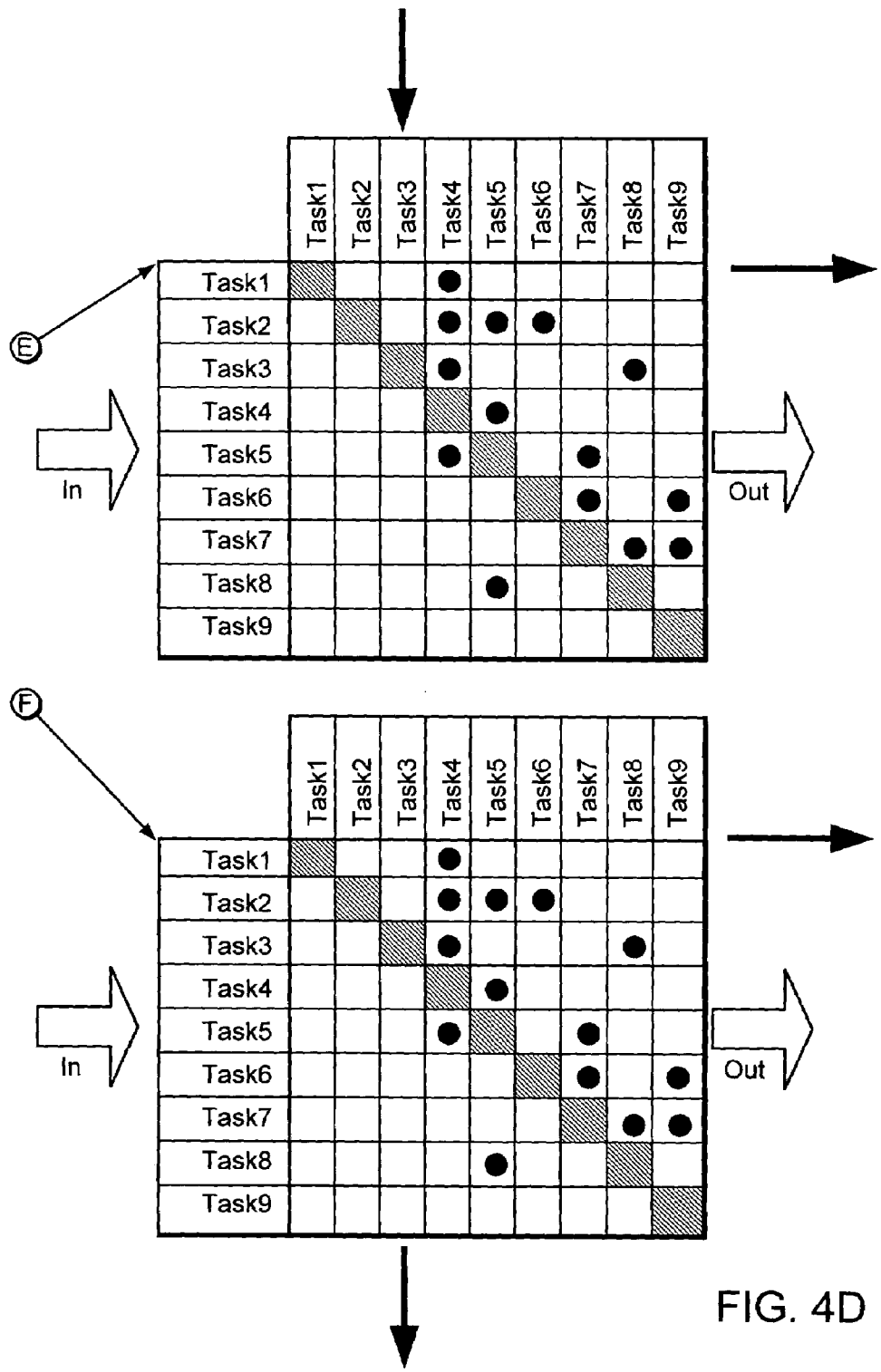
Figure 5:
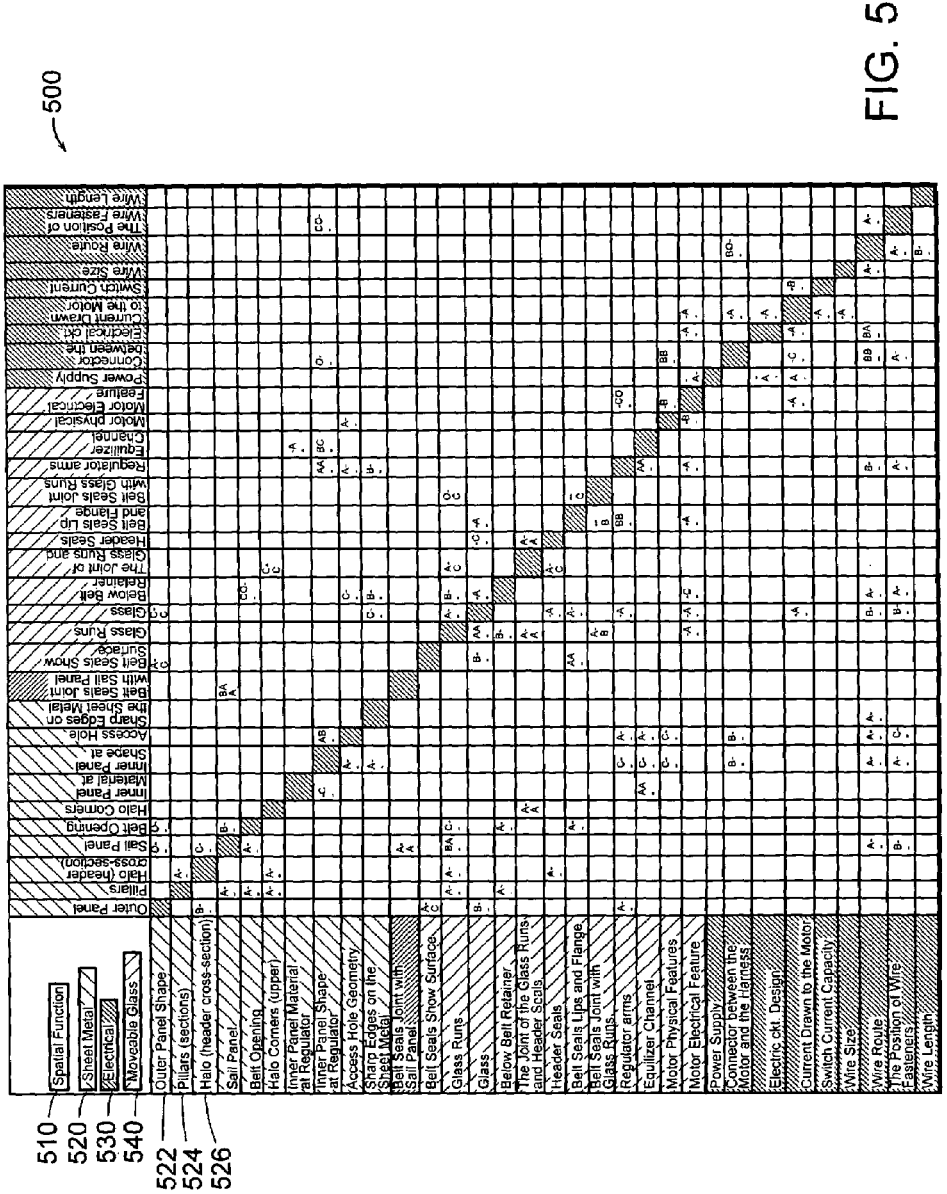
FIG. 5 is a prior art DSM rendering with one level of hierarchy and a second, fixed level implied by header color from Dong (1999)
Figure 20A:
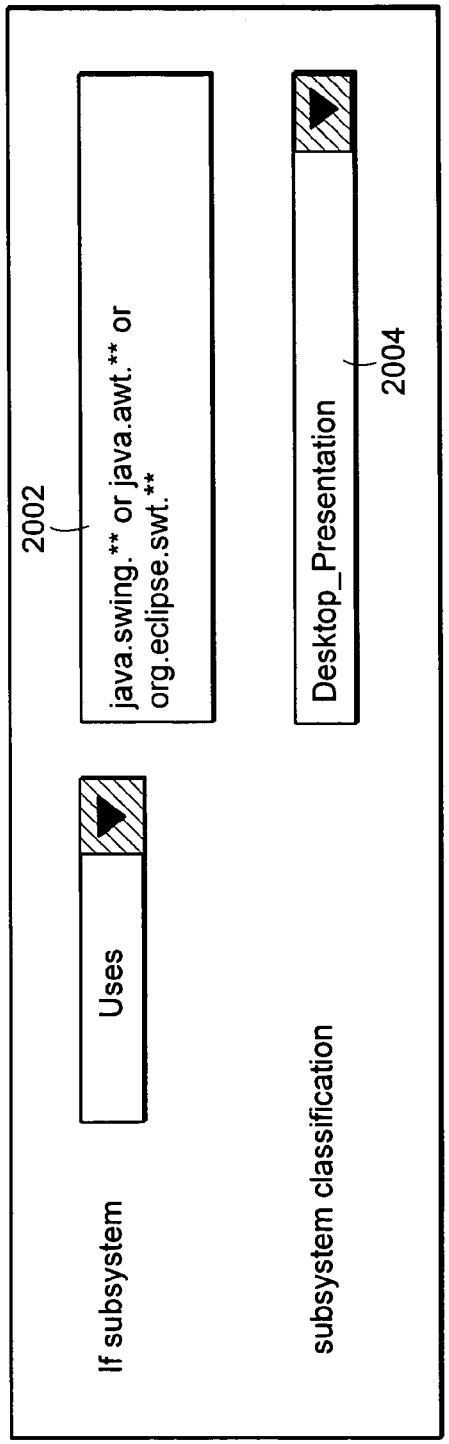
FIGS. 20A and 20B illustrate a definition of software subsystem classification hierarchy for "presentation" variants in accordance with an embodiment of the present invention.
Figure 20B:
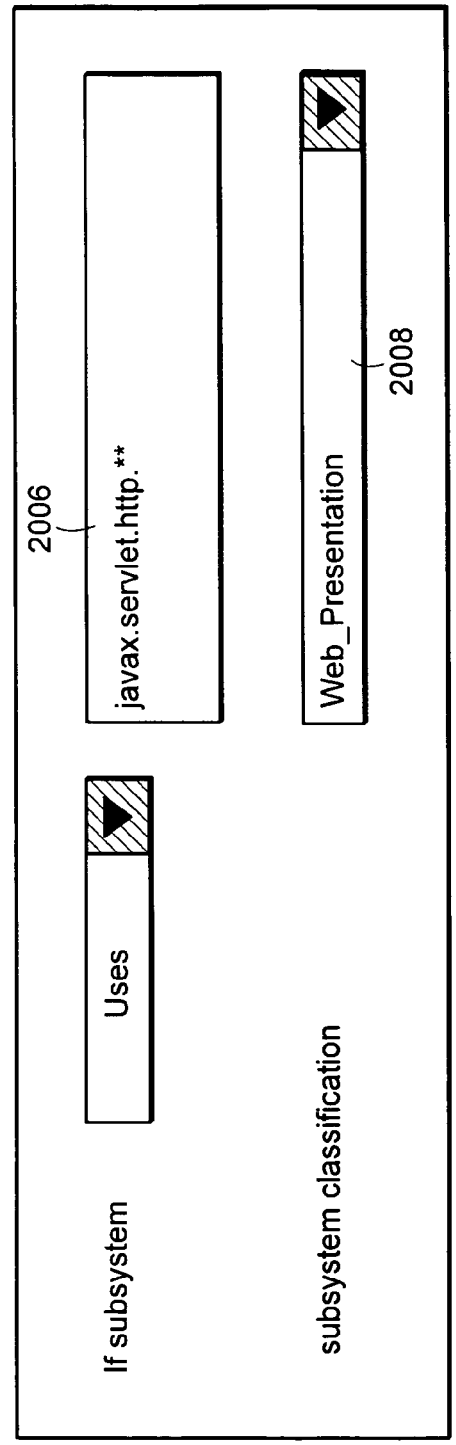
Figure 21:
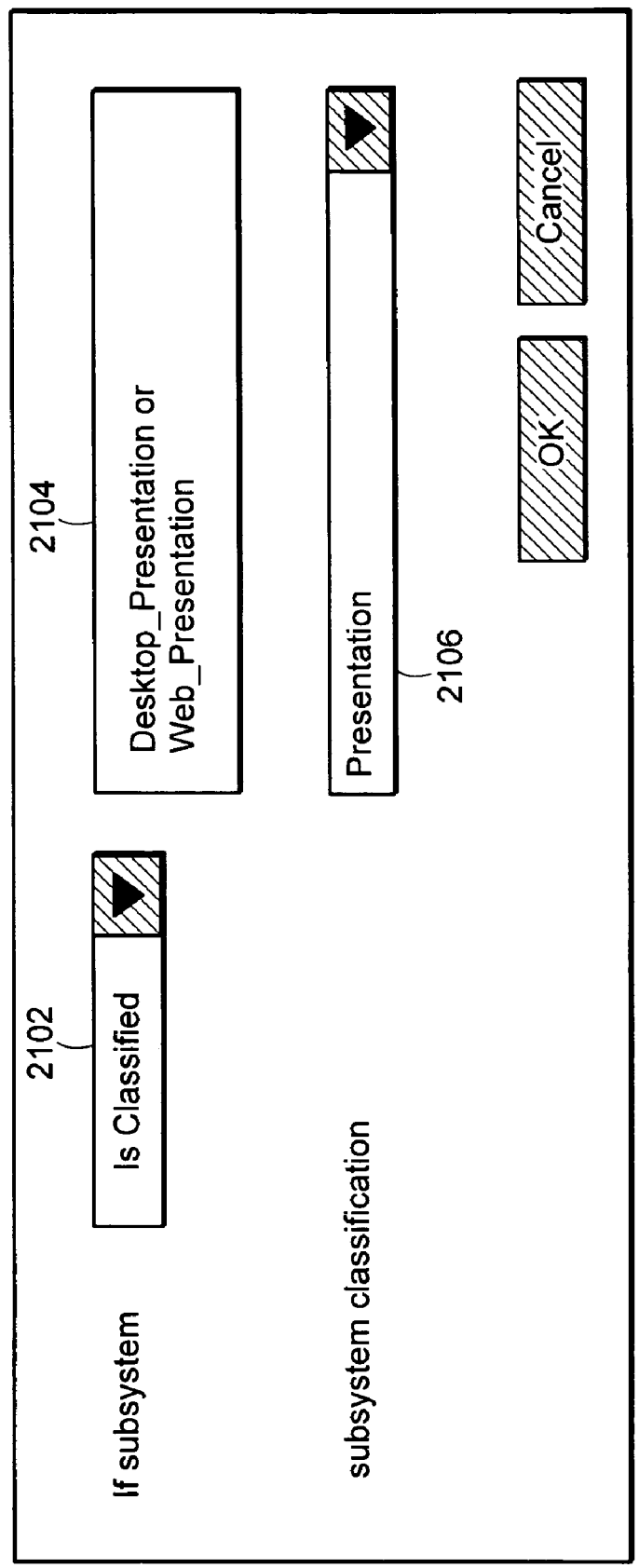
FIG. 21 illustrates a definition of software subsystem classification hierarchy for higher level "presentation" classification comprising "presentation" classification variants in accordance with an embodiment of the present invention.

FIGS. 20A and 20B and 21 show the definition of software subsystem classification hierarchy for presentation "variants". FIG. 20 contains two criteria definitions. In FIG. 20A, classification "Desktop_Presentation" is defined, and, in FIG. 2B, a classification "Web_Presentation" is defined. A subsystem fulfilling usage criteria 2002, "java.swing. or java.awt. or org.eclipse.swt." has the classification of field 2004, in this case, "Desktop_Presentation." In FIG. 20B, a subsystem fulfilling usage criteria 2006, "javax.servlet.http." has the classification of field 2008, in this case, "Web_Presentation."

FIG. 21 illustrates creation of a super-classification for "Presentation" using the classifications "Desktop_Presentation" and "Web_Presentation" defined in FIGS. 20A and 20B, respectively. FIG. 21 shows a definition of software subsystem classification hierarchy for higher level "presentation" classification comprising "presentation" classification variants. Conditional operator 2102, in this case, is "Is Classified". Specific classifications 2104 result in definition of a new, super classification 2106. In this example, the specific classifications are "Desktop_Presentation or Web_Presentation" and the super classification is "Presentation."

In FIG. 19, classification "Presentation" is directly based on external subsystems "used". In FIGS. 20A and 20B and FIG. 21, the classification "Presentation" is defined by first defining two, more granular, classifications, and then defining "Presentation" as a super classification made up of the two more granular classifications, "Desktop_Presentation", and "Web Presentation". In the example presented in FIGS. 19-21, the "uses" criteria is ultimately the same for both methods of defining "Presentation".

FIG. 22 illustrates defining design rules using subsystem classifications. Classifications, once defined, may be used in rules to make powerful, more re-usable rules. New external systems may be added to the system, and, as long as they are properly classified, may be affected subsystems in design rule evaluation. Complete rule 2202 employs a classification for both the Source and the Target. Although classifications are identified by a preceding character "#", the selection of "#" is an arbitrary choice. The identification character may be any character not generally found as the first character of a subsystem name. In this example, the "Source" 2204 of the rule identifying the subsystem to which the rule is applied, are subsystems having the classification "Persistence". The "Target" 2206 of the rule are subsystems having the classification "Presentation." The design rule "#Persistence CANNOT-Use #Presentation" establishes that subsystems handling the persistence of information in a system cannot use subsystems that create presentation for interaction with users.

Figure 23:
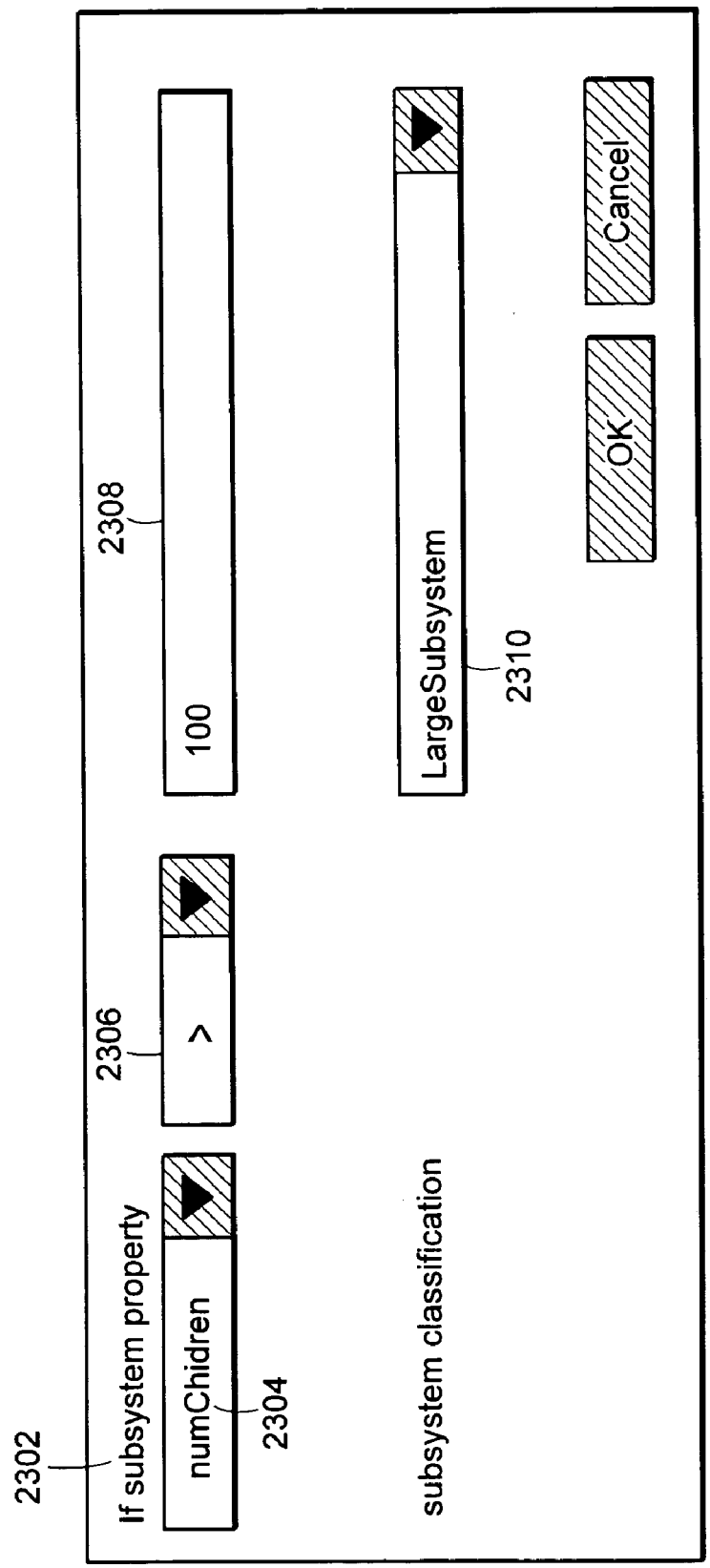
FIG. 23 illustrates classification definition criteria based on subsystem properties in accordance with an embodiment of the present invention.

FIG. 23 shows a subsystem classification criteria based on subsystem properties. The conditional "If subsystem property" 2302 is applied to property 2304. In this example, the property 2304 is "numChildren", which is the number of subsystems that are directly in a parent subsystem. "numChildren" differs from "numDescendents" which includes not only the number of systems directly in the Parent subsystem, but also, all of their descendants. Conditional operator 2306 for the criteria is ">", meaning "greater than". Operators may also include "<" for "less than", "<=" for "less than or equal to", ">=" for "greater than or equal to", "=" for "equal to", etc. Property 2304 is evaluated against the value 2308 using the operator 2306. In FIG. 23, the value is "100". Field 2310 contains the textual name of the classification meeting the criteria defined, in this case, "Large Subsystem". The field 2310 may be specified by a selection from a dropdown list containing previously defined classifications or by manual typing by the user of the ArchMap computer application.

In FIG. 23, the criteria for setting the classification is "If subsystem property, numChildren, is greater than 100, then set the classification for this subsystem to 'LargeSubsystem'". The user interface may also be implemented in other ways, depending upon user preferences for simplicity versus power. One implementation may be as a single criteria field such that the criteria to be evaluated is: if "numChildren>100". Other implementations may include more programming language-like syntax such as "If (property.numChildren>100) then classification=LargeSubsystem". Additional logical operators such "and", "or", and similar, may also be supported.

Subsystem properties come within two categories, default properties and user defined properties. Default properties may be determined by and assigned by the ArchMap computer application by default. Examples of default properties are "name", "numChildren", and "numDescendents". User defined properties may be directly assigned by the user, or determined based on criteria or calculations pertinent to a specific customer or project. For example, if a user wants to know the number of siblings associated with a subsystem, and the number is not a default property, a user defined property corresponding to "numSiblings=this.getParent( ).getProperty("numChildren")−1" may be employed.

Classification, sometimes discussed as categorization, has been used previously in several domains. Two are data mining and product lifecycle management (PLM).

In data mining, a taxonomy is established and used to aid in the categorizing of structured, semi-structured, and largely unstructured data. Document categorization is an example of semi-structured or unstructured data being categorized. Commercial and research offerings associated with document categorization typically assign a classification or category based on the content of the data being processed, either keywords or specific relationships between the data being processed. These categorizations are applied to data including documents, and not to software subsystems.

Within PLM, classification is used to create groupings of similar parts for easier navigation and retrieval for mechanical product designers. A PLM system may involve storing the part information including meta-data, CAD models, supplier information, etc that are part of a list of parts used in a product designed for manufacture. Generally, products are described and navigated as a series of Bills of Material (BOMs). However, when a new product or subsystem is being designed, it is preferable to find parts already in use in other products already being built. It is easier to find and navigate previously utilized parts in a classification system than in a BOM. Part re-use creates economies of scale because of volume purchasing, use of approved vendors, etc. Typically, in PLM, these classifications are assigned manually, though some automated processing may be utilized to establish classifications. Often, the classification schemes are hierarchical. These classifications are applied to mechanical parts, and not to software subsystems, and are not based on dependency relationships.

As discussed herein software subsystems are classified, and software subsystems usage of other software subsystems information is used to automatically classify software subsystems.

Figure 24:
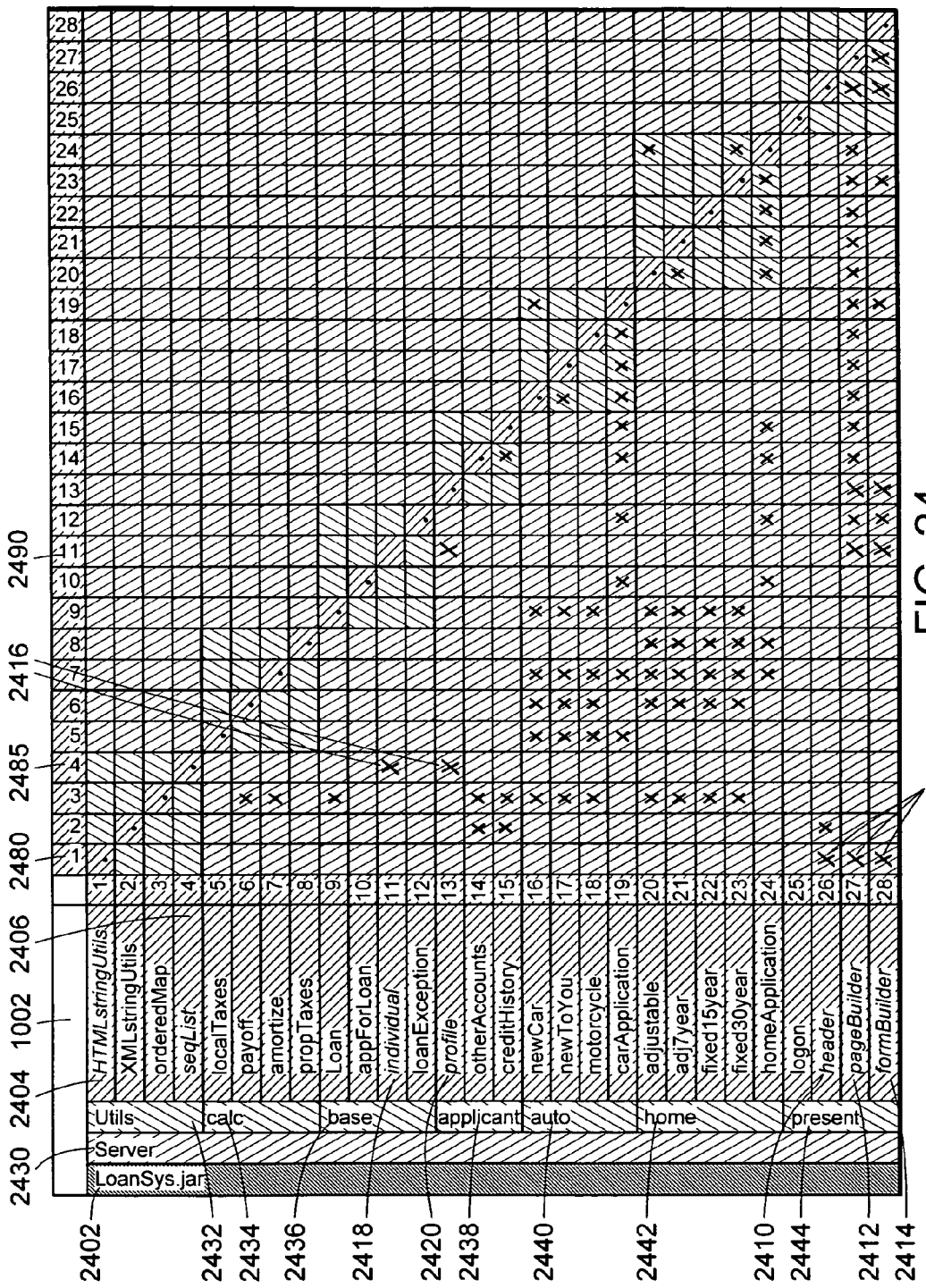
FIG. 24 illustrates a display of all software subsystems affected by a change to the software system in accordance with an embodiment of the present invention.

FIG. 24 illustrates display of all software subsystems affected by a change to a software system in the context of a hierarchical software system DSM 1002. "LoanSys.jar" 2402, the system under analysis and being changed, corresponds to a jar file or other toplevel container or root of the system. "LoanSys", an example software system, is a web application for processing applications for home and auto loans. "Server" 2430 is the top level subsystem of LoanSys and is comprised of seven subsystems. In this case, the subsystems are Java packages including "utils" 2432, "calc" 2434, "base" 2436, "applicant" 2438, "auto" 2440, "home" 2442, and "present" 2444. In FIG. 24, the DSM 1002 is in block triangular form, a DSM term meaning that there are no dependency marks above the diagonal and outside of intra-package interactions.

Java implementation language has some specific names for certain types of subsystems. The most granular or smallest subsystem that may stand alone is called a "class", and the first level of aggregation of subsystems in Java implementation is called a "package". Packages contain classes. Both class and package are herein considered subsystems.

Although used by the most other packages, subsystem Server.utils 2432 does not use any other package itself. Because all of the other six packages use Server.utils 2432, changes to Server.utils 2432 may lead to unexpected behaviors or defects in many parts of the system. FIG. 24 identifies both the parts of Server.utils 2432 changed and the other packages and classes affected by such a change, allowing testing of only those subsystems affected by the change. Change in Server.utils.HTMLstringUtils 2404 is indicated by the classname being bold and italic. When color is available, the classname Server.utils.HTMLstringUtils may also be colored, for example, in red. Change of Server.utils.seqList 2406 is indicated by its classname being bold and italic. When color is available, the classname Server.utils.seqList may also be colored, for example, in red.

Determining all affected DSM elements may be accomplished first by traversing a column associated with a changed element. In FIG. 24, the software system DSM is fully expanded such that all DSM elements with row and column numbers, that is, subsystems, are java classes. A DSM element means the subsystem that appears in horizontal text in the Row Headers with a row number, and has a corresponding numbered column. Examination of column 2480 associated with Server.utils.HTMLstringUtils 2404 indicates that three other classes 2408 depend on Server.utils.HTMLstringUtils 2404: Server.present.header 2410, Server.present.PageBuilder 2412, and Server.present.formBuilder 2414. The dependency marks for the classes 2408 are now italic. They are also red when color is available. An italic font also indicates Server.present.header 2410, Server.present.pageBuilder 2412, and Server.present.formBuilder 2414 are affected classes and may also be red when color is available. Classes affected by change to Server.utils.HTMLstringUtils 2404 are thus identified.

Dependency marks 2416 in column 2485 associated with Server.utils.seqList 2406 indicate that two other classes depend on Server.utils.seqList 2406 where dependency marks 2416 are in italic and may be red when color is available. Labels for Server.base.individual 2418 and Server.applicant.profile 2420 also indicate dependency by being italic and, possibly, in red when color is available.

Identification of affected subsystems is repeated with all changed classes, and, then, with all affected classes. For example, examination of column 11 2490 associated with affected class Server.applicant.individual 2418 identifies three dependency marks indicating that three classes depend on Server.base.individual 2418. In this example, those three classes are already identified as affected classes. The process of examining the associated columns of affected classes to identify other classes dependent upon them continues until the list of changed classes and affected classes is exhausted.

If the above change scenario occurs near the end of a software release cycle, where limited changes are accepted, without identification of those parts of the system affected, a QA analyst may have to assume that a full system functional test is required because a change occurred in Server.utils 2432 and because all packages may use Server.utils 2432. However, with the identification of affected subsystems, the QA analyst may obtain much finer grained information about the change to the system, and more importantly, may see the complete list of affected sub-systems. In the example illustrated in FIG. 24, although Server.utils 2432 is used by all other packages in the system, only Server.base 2436, Server.applicant 2438 and Server.present 2444 packages are affected by changes to Server.utils 2432, and, in fact, only seven classes in all are affected.

FIG. 25 illustrates display of the level of knowledge of developers regarding implementation of individual software subsystems. When the ArchMap computer application is integrated with a source code revision control system, the association of developers with changes in subsystems, the number of lines of code written by each developer, and similar information are available to the ArchMap computer application. A grid user interface containing subsystem decomposition as rows and system developers as columns allows ready assessment of the implementation expertise of the developers of a software system. For application LoanSys.jar 2502, the subsystem decomposition used for the basis for the DSM representation in FIG. 24 appears as the rows of knowledge/expertise map 2500. List 2506 includes developers who have made modifications to the code-base. Cells 2508 corresponding to a subsystem and developer contain a score indicative of the level of knowledge that the developer has about the subsystem. In this embodiment, scores range from 0 (not displayed) to 5. The highest score (5) is based on a percentage of total lines of code in a subsystem checked in, in this case, 50%. The range of the scores and the percentages to achieve the scores may be changed to suit the individual needs of a specific software development organization.

In another embodiment, subsystem classifications are placed as rowheaders rather than the actual subsystem decomposition hierarchy. Thus with classifications such as "Presentation" and "Persistence", this map will indicate which developers have relevant Presentation (User Interface) expertise or relevant Persistence (e.g. database) expertise.

A further embodiment displays the developers in a hierarchy. Rows contain system decomposition hierarchy or classification hierarchy, and the columns contain an organizational hierarchy. This presentation may be used to determine levels and to balance levels of specific expertise among groups or departments.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for managing, in a computer system, design of a software system, the method comprising:

parsing the software system in a computer process to produce a stored representation of the software system including subsystems and dependency relationships among the subsystems;

providing a graphical interface for receiving user input of a new rule governing a dependency relationship among at least two of the subsystems;

storing the new rule as part of a set of rules, such rules being applied via a rule engine, such rules and the stored representation being collectively treated as a project;

causing graphical display of the stored representation of the software system, and using the rule engine to provide visual indication, in the display, of subsystems with respect to which the new rule has been applied;

wherein at least one of the graphical interface and the graphical display provides a display of the subsystems in a hierarchy within a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection and wherein the new rule is visually indicated in a cell of the matrix at an intersection of a column corresponding to one of the at least two subsystems and a row corresponding to another one of the at least two subsystems.

2. The method according to claim 1, wherein the new rule allows the dependency relationship.

3. The method according to claim 1, wherein the new rule disallows the dependency relationship.

4. The method according to claim 1, wherein the new rule requires the dependency relationship.

5. The method according to claim 1, wherein providing a graphical interface for receiving user input of the new rule includes providing a graphical interface for receiving user input specifying at least one metadata definition that establishes a classification for application of the new rule.

6. A method according to claim 5, wherein the classification is assignable manually.

7. A method according to claim 5, wherein the classification is assigned automatically on the basis of specified criteria.

8. A method according to claim 5, wherein the classification is based on properties of the relevant subsystems.

9. A method according to claim 5, wherein the graphical interface for receiving user input specifying at least one metadata definition includes an interface for defining the classification as part of a hierarchical classification system.

10. A method according to claim 1, wherein the rule engine normally causes the new rule to be inherited by any descendants of any subsystems in the hierarchy to which the new rule applies.

11. A method according to claim 10, further comprising providing a graphical interface for receiving a user override input applicable to the new rule, such override input causing the rule engine to override any inheritance of the new rule applied to an ancestor subsystem in the hierarchy, such override input being itself an inheritable rule.

12. A method according to claim 1, wherein the indication of the new rule includes use of color.

13. A method according to claim 1, wherein indication of the new rule includes use of a symbol.

14. A method according to claim 1, wherein indication of the new rule includes use of location of placement in the cell.

15. A method according to claim 1, wherein both the graphical interface and the graphical display employ a dependency structure matrix.

16. A method for managing, in a computer system, an updated version of a software system, such version having been updated from a previous version of the software system, the method comprising:

parsing the updated version of the software system in a computer process to produce a second stored representation of the updated version of the software system including subsystems thereof and dependency relationships among the subsystems thereof;

accessing a first stored representation of the previous version of the software system, including subsystems thereof and dependency relationships among the subsystems thereof, wherein the first stored representation of the previous version is the result of parsing the previous version of the software system; and providing a graphical output from the computer system based on the first and second stored representations, in which appears a hierarchical display of the subsystems of both the updated and previous versions of the software system within a dependency structure matrix, such display indicating graphically subsystems that have been changed by the updated version, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection.

17. A method according to claim 16, wherein having the display indicating graphically subsystems that have been changed by the updated version includes using a subsystem label style for a changed subsystem different from a subsystem label style for a subsystem unaffected by the change.

18. A method according to claim 16, wherein having the display indicating graphically subsystems that have been changed by the updated version includes providing an indicator, of a dependency relationship affected by a change to a subsystem, that differs from an indicator of dependency unaffected by the change.

19. A method for managing, in a computer system, design of a software system, the method comprising:
parsing the software system in a computer process to produce a stored representation of the software system including subsystems and dependency relationships among the subsystems; and
providing a graphical output from the computer system, based on the stored representation, in which appears a display of the subsystems in a hierarchy within a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection.

20. A method according to claim 19, wherein, in an instance when a given parent subsystem has been expanded by user graphical selection within the hierarchy itself within the matrix to show its hierarchical children, dependencies are shown for such hierarchical children but not for such parent subsystem.

21. A method according to claim 20 where relation of such hierarchical children to such parent subsystem is shown by placing the parent subsystem sidewise alongside such children.

22. A method according to claim 19, further comprising:
in response to a graphical user input that selects at least one subsystem within the hierarchy itself within the matrix, and that causes such subsystem to be located in a new displayed location in the hierarchy and thus alters the hierarchy of subsystems displayed in the dependency structure matrix, automatically altering the dependency relationships among the subsystems to be consistent therewith, and causing an update of the stored representation of the subsystems and dependency relationships among the subsystems to reflect the graphical user input.

23. A method according to claim 22, wherein the graphical user input altering the hierarchy of subsystems includes removing a subsystem and automatically altering the dependency relationships includes operating in a manner as to cause removal of dependencies of the removed subsystem.

24. A method according to claim 22, wherein the graphical user input altering the hierarchy of subsystems includes adding a subsystem, and automatically altering the dependency relationships includes operating in a manner as to preserve dependencies of the added subsystem.

25. A method according to claim 19, wherein the dependency structure matrix display uses at least one of pattern or color to indicate a hierarchical level.

26. A method according to claim 25, wherein the dependency structure matrix uses color to indicate the hierarchical level applicable to each cell of the matrix.

27. An apparatus, implemented in a computer system, for managing design of a software system, the apparatus comprising:
an input for receiving a software system to be analyzed;
a partitioner, coupled to the input, and a dependency extractor, coupled to the input, the partitioner and the dependency extractor collectively parsing the software system to produce a representation of the software system including subsystems and dependency relationships among the subsystems;
a system representation storage arrangement, coupled to the partitioner and the dependency extractor, that stores the system representation; a graphical interface for receiving a user input of a new rule governing a dependency relationship among at least two of the subsystems;
a rules storage arrangement that stores rules associated with the software system;
a rule engine, coupled to the stored representation and to the rules storage arrangement, that creates, modifies, and evaluates the rules; and
a display output providing a graphical display of the stored representation of the software system, such output coupled to the system representation storage arrangement and to the rule engine and providing visual indication, in the display, of subsystems with respect to which the new rule has been applied;
wherein at least one of the graphical interface and the graphical display is in the form of a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection and wherein the new rule is visually indicated in a cell of the matrix at an intersection of a column corresponding to one of the at least two subsystems and a row corresponding to another one of the at least two subsystems.

28. A computer program product for use on a computer system for managing design of a software system, the computer program product comprising a computer usable medium having computer readable program code thereon, which, when loaded into the computer system, establishes an apparatus, implemented in a computer system, the apparatus comprising:
an input for receiving a software system to be analyzed;
a partitioner ,coupled to the input, and a dependency extractor, coupled to the input, the partitioner and the dependency extractor collectively parsing the software system to produce a representation of the software system including subsystems and dependency relationships among the subsystems;
a system representation storage arrangement, coupled to the partitioner and the dependency extractor, that stores the system representation;
a graphical interface for receiving a user input of a new rule governing a dependency relationship among at least two of the subsystems; a rules storage arrangement that stores rules associated with the software system;
a rule engine, coupled to the stored representation and to the rules storage arrangement, that creates, modifies, and evaluates the rules; and a display output providing a graphical display of the stored representation of the software system, such output coupled to the system representation storage arrangement and to the rule engine and providing visual indication, in the display, of subsystems with respect to which the new rule has been applied;

wherein at least one of the graphical interface and the graphical display is in the form of a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection and wherein the new rule is visually indicated in a cell of the matrix at an intersection of a column corresponding to one of the at least two subsystems and a row corresponding to another one of the at least two subsystems.

29. A computer program product according to claim 28, wherein the display output provides the graphical display is in the form of a dependency structure matrix and provides visual indication, of subsystems with respect to which the new rule has been applied, in pertinent cells of the dependency structure matrix.

30. A computer program product according to claim 29, wherein the visual indication is based on use of color.

31. A computer program product according to claim 29, wherein the visual indication is based on use of a symbol.

32. A computer program product according to claim 29, wherein the visual indication is based on location of placement in the pertinent cells.

33. A computer program product according to claim 28, wherein the display output provides the graphical display in the form of a dependency structure matrix and provides visual indication, of subsystems with respect to which the new rule has been applied, in a panel that is separate from the dependency structure matrix and viewable simultaneously with the dependency structure matrix.

34. A computer program product according to claim 28, wherein the graphical interface is further configured to receive the user input specifying at least one metadata definition that establishes a classification for an application of the new rule.

35. A computer program product according to claim 28, wherein the graphical interface is further configured to receive the user input specifying at least one metadata definition that establishes a classification, assignable manually, for an application of the new rule.

36. A computer program product according to claim 28, wherein the graphical interface is further configured to receive the user input specifying at least one metadata definition that establishes a classification, assigned automatically on the basis of specified criteria, for an application of the new rule.

37. A computer program product according to claim 28, wherein the graphical interface is further configured to receive the user input specifying at least one metadata definition that establishes a classification, based on properties of the relevant subsystems, for an application of the new rule.

38. A computer program product according to claim 28, wherein the graphical interface is further configured to receive the user input specifying at least one metadata definition that establishes a classification, defined as part of a hierarchical classification system, for an application of the new rule.

39. A computer program product according to claim 28, wherein both the graphical interface and the display output employ a dependency structure matrix.

40. An apparatus, implemented in a computer system, for managing an updated version of a software system, the updated version having been updated from a previous version of the software system, the apparatus comprising:

an input for receiving an updated software system to be managed;

a partitioner, coupled to the input, and a dependency extractor, coupled to the input, the partitioner and the dependency extractor collectively parsing the updated version of the software system to produce a second representation of the updated version of the software system including subsystems thereof and dependency relationships among the subsystems thereof;

a system representation storage arrangement, coupled to the partitioner and the dependency extractor, that stores the second system representation as well as a first system representation resulting from operation of the partitioner and dependency extractor on the previous version of the software system; and a display output, coupled to the system representation storage arrangement, the display output configured to provide a graphical display ,based on the first and the second stored representations, in which appears a display of the subsystems in a hierarchy within a dependency structure matrix, of both the updated and previous versions of the software system, such graphical display indicating subsystems that have been changed in the updated version of the software system, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection.

41. A computer program product for use on a computer system for managing, in a computer system, an updated version of a software system, the updated version having been updated from a previous version of the software system, the computer program product comprising a computer usable medium having computer readable program code thereon, which, when loaded into the computer system, establishes an apparatus implemented in the computer system, the apparatus comprising:

an input for receiving an updated software system to be managed;

a partitioner, coupled to the input, and a dependency extractor, coupled to the input, the partitioner and the dependency extractor collectively parsing the updated version of the software system to produce a second representation of the updated version of the software system including subsystems thereof and dependency relationships among the subsystems thereof;

a system representation storage arrangement, coupled to the partitioner and the dependency extractor, that stores the second system representation as well as a first system representation resulting from operation of the partitioner and dependency extractor on the previous version of the software system; and a display output, coupled to the system representation storage arrangement, the display output configured to provide a graphical display, based on the first and the second stored representations, in which appears a display of the subsystems in a hierarchy within a dependency structure matrix, of both the updated and previous versions of the software system, such graphical display indicating subsystems that have been changed in the updated version of the software system, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection.

42. A computer program product according to claim 41, wherein the display output is further configured to provide a graphical display, based on the first and the second stored representations, in which appears a display of the subsystems in a hierarchy within a dependency structure matrix, of both the updated and previous versions of the software system, such graphical display indicating subsystems that have been changed in the updated version of the software system by using a subsystem label style that is different from a subsystem label style for subsystems not so changed.

43. A computer program product according to claim 41, wherein the display output further configured to provide a graphical display, based on the first and the second stored representations, in which appears a display of the subsystems in a hierarchy within a dependency structure matrix, of both the updated and previous versions of the software system, such graphical display indicating dependency relationships among subsystems that have been changed in the updated version of the software system in a manner different from indicating dependency relationships among subsystems not so changed.

44. An apparatus, implemented in a computer system, for managing design of a software system, the apparatus comprising:

a partitioner and a dependency extractor, collectively parsing the software system to produce a representation of the software system including subsystems and dependency relationships among the subsystems;

a system representation storage arrangement, coupled to the partitioner and the dependency extractor, that stores the representation of the software system; and a display output, coupled to the system representation storage arrangement, that provides a graphical display, based on the representation stored in the system representation storage arrangement, of the subsystems in a hierarchy within a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection.

45. A computer program product for use on a computer system for managing, in a computer system, design of a software system, the computer program product comprising a computer usable medium having computer readable program code thereon, which, when loaded into the computer system, establishes an apparatus, implemented in the computer system, the apparatus comprising:

a partitioner and a dependency extractor, collectively parsing the software system to produce a representation of the software system including subsystems and dependency relationships among the subsystems;

a system representation storage arrangement, coupled to the partitioner and the dependency extractor, that stores the representation of the software system; and a display output, coupled to the system representation storage arrangement, that provides a graphical display, based on the representation stored in the system representation storage arrangement, of the subsystems in a hierarchy within a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection.

46. A computer program product according to claim 45, wherein, in an instance when a given parent subsystem has been expanded to show its hierarchical children, dependencies are shown for such hierarchical children but not for such parent subsystem.

47. A computer program product according to claim 45, wherein, in an instance when a given parent subsystem has been expanded to show its hierarchical children, the display output provides the graphical display of the subsystems in a hierarchy within the dependency structure matrix that graphically indicates the relations of such hierarchical children to such parent subsystem by placing the parent subsystem sidewise alongside such children.

48. A computer program product according to claim 45, wherein the display output is further configured to provide the graphical display of the subsystems in a hierarchy within the dependency structure matrix that uses at least one of pattern or color to indicate hierarchical level.

49. A computer program product according to claim 48, wherein the display output is further configured to provide the graphical display of the subsystems in a hierarchy within the dependency structure matrix that uses color to indicate hierarchical level applicable to each cell of the matrix.

50. A method for managing, in a computer system, design of a software system, the method comprising:
  parsing the software system in a computer process to produce a stored representation of the software system including subsystems and dependency relationships among the subsystems; and
  providing a graphical output from the computer system, based on the stored representation, in which appears
    (i) a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection and
    (ii) an information pane, distinct from the dependency structure matrix, containing information content dependent upon the user's graphical selection within the dependency structure matrix.

51. A method according to claim 50, wherein providing the graphical output includes causing the information pane to display source code of the graphical selection in the dependency structure matrix.

52. A method according to claim 50, wherein providing the graphical output includes causing the information pane to display dependency relationships of the graphical selection in the dependency structure matrix.

53. A method according to claim 52, wherein causing the information pane to display dependency relationships includes causing the information pane to display dependency relationships for subsystems that are used by a subsystem that has been made a subject of the graphical selection.

54. A method according to claim 52, wherein causing the information pane to display dependency relationships includes causing the information pane to display dependency relationships for subsystems that use a subsystem that has been made a subject of the selection.

55. A method according to claim 50, further comprising receiving user-inputted rules and storing the rules; wherein providing the graphical output includes causing the information pane to display rules that are pertinent to the selection.

56. A method according to claim 55, wherein providing the graphical output includes causing the information pane to display violations of the rules that are pertinent to the selection.

57. An apparatus, implemented in a computer system, for managing design of a software system, the apparatus comprising:
  an input for receiving a software system to be analyzed;
  a partitioner, coupled to the input, and a dependency extractor, coupled to the input, the partitioner and the dependency extractor collectively parsing the software system to produce a representation of the software system including subsystems and dependency relationships among the subsystems;
  a system representation storage arrangement, coupled to the partitioner and the dependency extractor, that stores the system representation;
  a display output providing a graphical display of the stored representation of the software system, such output coupled to the system representation storage arrangement, the display output including
    (i) a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection, and
    (ii) an information pane, distinct from the dependency structure matrix, containing information content dependent upon a graphical selection by a user within the dependency structure matrix.

58. An computer program product for use on a computer system for managing, in a computer system, design of a software system, the computer program product comprising a computer usable medium having computer readable program code thereon, which, when loaded into the computer system, establishes an apparatus implemented in the computer system, the apparatus comprising:
  an input for receiving a software system to be analyzed;
  a partitioner ,coupled to the input, and a dependency extractor, coupled to the input, the partitioner and the dependency extractor collectively parsing the software system to produce a representation of the software system including subsystems and dependency relationships among the subsystems;
  a system representation storage arrangement, coupled to the partitioner and the dependency extractor, that stores the system representation;
  a display output providing a graphical display of the stored representation of the software system, such output coupled to the system representation storage arrangement, the display output including
    (i) a dependency structure matrix, wherein the dependency structure matrix is a symmetric matrix in which a corresponding row and column relate to an identical subsystem and each cell of the matrix has a value indicative of the presence or absence of a dependency; and wherein levels of hierarchy of the system are displayed in a row or column header of the dependency structure matrix, and such header can be selectively expanded or collapsed by user graphical selection therein, such selection automatically altering the display of the hierarchy and of the dependency relationships among the subsystems to be consistent therewith, and causing an update of the stored representation of the subsystems and dependency relationships among the subsystems to reflect the graphical user selection, and (ii) an information pane, distinct from the dependency structure matrix, containing information content dependent upon a graphical selection by a user within the dependency structure matrix.

59. A computer program product according to claim 58, wherein the display output is further configured to display, in the information pane, a source code of the graphical selection in the dependency structure matrix.

60. A computer program product according to claim 58, wherein the display output is further configured to display, in the information pane, dependency relationships of the graphical selection in the dependency structure matrix.

61. A computer program product according to claim 60, wherein the display output is further configured to display, in the information pane, dependency relationships for subsystems that are used by a subsystem that has been made a subject of the graphical selection.

62. A computer program product according to claim 60, wherein the display output is further configured to display, in the information pane, dependency relationships for subsystems that use a subsystem that has been made a subject of the selection.

63. A computer program product according to claim 58, wherein the apparatus is further comprising
- a graphical interface for receiving user-inputted rules governing a dependency relationship among at least two of the subsystems; and
- a rules storage arrangement that stores rules associated with the software system,
- wherein the display output is further configured to display, in the information pane, rules that are pertinent to the graphical selection.

64. A computer program product according to claim 58, wherein the display output is further configured to display, in the information pane, violations of rules that are pertinent to the graphical selection.

\* \* \* \* \*